(12) United States Patent
Braunstein et al.

(10) Patent No.: US 12,132,439 B2
(45) Date of Patent: *Oct. 29, 2024

(54) CLAMPS FOR SOLAR SYSTEM

(71) Applicant: SUNPOWER CORPORATION, San Jose, CA (US)

(72) Inventors: Ryan Braunstein, San Carlos, CA (US); Zachary Kinyon, Walnut Creek, CA (US); Guillaume Carre, Emeryville, CA (US); David Matrat, Lyons (FR)

(73) Assignee: SUNPOWER CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,255

(22) Filed: Feb. 3, 2023

(65) Prior Publication Data

US 2023/0188085 A1 Jun. 15, 2023

Related U.S. Application Data

(63) Continuation of application No. 17/447,264, filed on Sep. 9, 2021, now Pat. No. 11,575,344, which is a
(Continued)

(51) Int. Cl.
*H02S 20/23* (2014.01)
*F24S 25/00* (2018.01)
(Continued)

(52) U.S. Cl.
CPC ............. *H02S 20/23* (2014.12); *F24S 25/00* (2018.05); *F24S 25/30* (2018.05); *F24S 25/33* (2018.05);
(Continued)

(58) Field of Classification Search
CPC ........ F24S 25/00; F24S 25/634; F24S 25/636; F24S 25/70; F24S 25/60; F24S 2025/016; Y02E 10/47; H02S 20/23
See application file for complete search history.

(56) References Cited

U.S. PATENT DOCUMENTS

| 3,968,841 A | 7/1976 | Harmathy |
| 4,005,557 A | 2/1977 | Kramer et al. |

(Continued)

FOREIGN PATENT DOCUMENTS

| AU | 2002301823 B2 | 3/2002 |
| AU | 2008200493 B2 | 2/2008 |

(Continued)

OTHER PUBLICATIONS

International Search Report and Written Opinion mailed Apr. 24, 2013, issued in International Application No. PCT/US2012/069570 filed Apr. 24, 2013, 9 pages.

(Continued)

*Primary Examiner* — Jessie T Fonseca
(74) *Attorney, Agent, or Firm* — Oblon, McClelland, Maier & Neustadt, L.L.P.

(57) ABSTRACT

A solar power system can include a rail and a solar module disposed on the rail. A clamp assembly can couple the solar module to the rail. The clamp assembly can have a clamped configuration in which the solar module is secured to the rail and an unclamped configuration. The clamp assembly can comprise an upper clamp member, a lower clamp member coupled to the rail, and a stabilization member mechanically engaging the upper clamp member and the lower clamp member. The stabilization member can prevent rotation of the lower clamp member relative to the rail when the clamp assembly is in the clamped and unclamped configurations. In the unclamped configuration, the stabilization member can be biased such that the upper clamp member is disposed (Continued)

at a sufficient clearance above the rail to permit the insertion of the solar module between the upper clamp member and the rail.

14 Claims, 26 Drawing Sheets

Related U.S. Application Data continuation of application No. 16/864,736, filed on May 1, 2020, now Pat. No. 11,121,668, which is a continuation of application No. 16/537,165, filed on Aug. 9, 2019, now Pat. No. 10,680,548, which is a continuation of application No. 15/383,757, filed on Dec. 19, 2016, now Pat. No. 10,432,133, which is a continuation of application No. 14/139,755, filed on Dec. 23, 2013, now Pat. No. 9,531,319.

(51) Int. Cl.
    *F24S 25/30*     (2018.01)
    *F24S 25/33*     (2018.01)
    *F24S 25/634*    (2018.01)
    *F24S 25/636*    (2018.01)
    *F24S 25/70*     (2018.01)
    *H02S 30/10*     (2014.01)
    *F24S 25/60*     (2018.01)

(52) U.S. Cl.
    CPC .......... *F24S 25/634* (2018.05); *F24S 25/636* (2018.05); *F24S 25/70* (2018.05); *H02S 30/10* (2014.12); *F24S 2025/016* (2018.05); *F24S 25/60* (2018.05); *Y02B 10/10* (2013.01); *Y02B 10/20* (2013.01); *Y02E 10/47* (2013.01); *Y10T 24/44* (2015.01); *Y10T 24/44017* (2015.01); *Y10T 24/44265* (2015.01); *Y10T 24/44641* (2015.01); *Y10T 29/49355* (2015.01)

(56) References Cited

U.S. PATENT DOCUMENTS

| | | |
|---|---|---|
| 5,375,798 A | 12/1994 | Hungerford, Jr. |
| 5,489,173 A | 2/1996 | Höfle |
| 5,571,338 A | 11/1996 | Kadonome et al. |
| 5,743,970 A | 4/1998 | Czubatjy et al. |
| 5,746,839 A | 5/1998 | Dinwoodie |
| 5,951,785 A | 9/1999 | Uchihashi et al. |
| 5,953,869 A | 9/1999 | Balfour et al. |
| 6,155,006 A | 12/2000 | Mimura et al. |
| 6,495,750 B1 | 12/2002 | Dinwoodie |
| 6,501,013 B1 | 12/2002 | Dinwoodie |
| 6,672,018 B2 | 1/2004 | Shingleton |
| 6,726,117 B2 | 4/2004 | Herb et al. |
| 6,959,517 B2 | 11/2005 | Poddany et al. |
| 6,959,520 B2 | 11/2005 | Hartman |
| 7,435,134 B2 | 10/2008 | Lenox |
| 7,592,537 B1 | 9/2009 | West |
| 7,780,472 B2 | 8/2010 | Lenox |
| 7,856,769 B2 | 12/2010 | Plaisted et al. |
| 7,900,407 B2 | 3/2011 | Plaisted |
| 7,956,281 B2 | 6/2011 | O'Brien et al. |
| 8,109,048 B2 | 2/2012 | West et al. |
| 8,181,926 B2 | 5/2012 | Magno, Jr. et al. |
| 8,375,654 B1 | 2/2013 | West et al. |
| 8,376,298 B2 | 2/2013 | McPheeters |
| 8,424,255 B2 | 4/2013 | Lenox et al. |
| 8,462,518 B2 | 6/2013 | Marroquin et al. |
| 8,469,644 B2 | 6/2013 | Chang |
| 8,505,864 B1 | 8/2013 | Taylor et al. |
| 8,650,813 B2 | 2/2014 | Botkin et al. |
| 8,763,316 B2 | 7/2014 | Concho et al. |
| 8,763,978 B2 | 7/2014 | Newman et al. |
| 9,253,935 B2 | 2/2016 | Morris et al. |
| 2007/0199561 A1 | 8/2007 | Soucy |
| 2007/0295391 A1 | 12/2007 | Lenox et al. |
| 2008/0223432 A1 | 9/2008 | Lee |
| 2009/0031640 A1 | 2/2009 | Elmes et al. |
| 2009/0114270 A1 | 5/2009 | Stancel |
| 2009/0114271 A1 | 5/2009 | Stancel |
| 2009/0320906 A1 | 12/2009 | Botkin et al. |
| 2010/0018571 A1 | 1/2010 | Placer |
| 2010/0212715 A1 | 8/2010 | Almy et al. |
| 2010/0276558 A1 | 11/2010 | Faust et al. |
| 2011/0000544 A1 | 1/2011 | West |
| 2011/0100434 A1 | 5/2011 | Van Walraven |
| 2011/0126881 A1 | 6/2011 | Hong et al. |
| 2011/0174947 A1 | 7/2011 | Wu |
| 2011/0179606 A1 | 7/2011 | Magno, Jr. et al. |
| 2011/0192098 A1 | 8/2011 | Chung |
| 2011/0214365 A1 | 9/2011 | Aftanas |
| 2011/0232715 A1 | 9/2011 | Lenox et al. |
| 2011/0265401 A1 | 11/2011 | Ritzler et al. |
| 2011/0289750 A1 | 12/2011 | Kats et al. |
| 2011/0290306 A1 | 12/2011 | Roberts |
| 2012/0102853 A1 | 5/2012 | Rizzo |
| 2012/0125410 A1 | 5/2012 | West et al. |
| 2012/0138764 A1 | 6/2012 | Kemple |
| 2012/0167957 A1 | 7/2012 | Verfuerth et al. |
| 2012/0199181 A1 | 8/2012 | Newman et al. |
| 2012/0205508 A1 | 8/2012 | Cusson et al. |
| 2012/0227791 A1 | 9/2012 | Vari |
| 2012/0234378 A1 | 9/2012 | West et al. |
| 2012/0248271 A1 | 10/2012 | Zeilenga |
| 2012/0255598 A1 | 10/2012 | West |
| 2012/0260972 A1 | 10/2012 | West et al. |
| 2012/0279258 A1 | 11/2012 | West et al. |
| 2012/0298186 A1 | 11/2012 | West |
| 2012/0298817 A1 | 11/2012 | West et al. |
| 2012/0301661 A1 | 11/2012 | West et al. |
| 2013/0011187 A1 | 1/2013 | Schuit et al. |
| 2013/0020455 A1 | 1/2013 | Sizelove et al. |
| 2013/0111830 A1 | 5/2013 | Aseere et al. |
| 2013/0140416 A1 | 6/2013 | West et al. |
| 2013/0180572 A1 | 7/2013 | West |
| 2013/0180573 A1 | 7/2013 | West |
| 2013/0192150 A1 | 8/2013 | DuPont et al. |
| 2013/0200245 A1 | 8/2013 | Markiewicz et al. |
| 2013/0313209 A1 | 11/2013 | Barth |
| 2013/0320166 A1 | 12/2013 | Kemple et al. |
| 2013/0340358 A1 | 12/2013 | Danning |
| 2014/0091050 A1 | 4/2014 | Zhang |
| 2015/0144181 A1 | 5/2015 | Gilchrist et al. |
| 2015/0144760 A1 | 5/2015 | Paradiso |
| 2015/0180404 A1 | 6/2015 | Braunstein et al. |
| 2015/0188486 A1 | 7/2015 | Marroquin |
| 2015/0200621 A1 | 7/2015 | Reed et al. |
| 2015/0249423 A1 | 9/2015 | Braunstein et al. |

FOREIGN PATENT DOCUMENTS

| | | |
|---|---|---|
| AU | 2011226964 A1 | 10/2011 |
| DE | 299 19 145 U1 | 1/2000 |
| DE | 202 04 146 U1 | 5/2002 |
| DE | 20 2004 015 811 U1 | 12/2004 |
| DE | 20 2005 006 951 U1 | 9/2005 |
| DE | 20 2005 015 455 U1 | 3/2007 |
| DE | 20 2009 003 667 U1 | 8/2009 |
| DE | 20 2010 011 235 U1 | 11/2010 |
| DE | 20 2011 001 761 U1 | 5/2011 |
| DE | 20 2011 005 287 U1 | 10/2011 |
| EP | 1 647 782 A2 | 4/2006 |
| EP | 2 239 783 A1 | 10/2010 |
| EP | 2 302 694 B1 | 3/2011 |
| EP | 2 495 508 A2 | 9/2012 |
| FR | 2 935 410 A1 | 3/2010 |
| FR | 2 989 153 | 10/2013 |
| GB | 1 563 709 A | 3/1980 |
| JP | S57-87561 | 6/1982 |
| JP | 06-221316 | 8/1994 |
| JP | 10-121640 | 5/1998 |
| JP | H10-122125 | 5/1998 |

(56) References Cited

FOREIGN PATENT DOCUMENTS

| | | |
|---|---|---|
| JP | H10-159284 | 6/1998 |
| JP | H11-222991 | 8/1999 |
| JP | H11-247387 | 9/1999 |
| JP | 2000-087515 | 3/2000 |
| JP | 2000-220268 | 8/2000 |
| JP | 2000-303638 | 10/2000 |
| JP | 2000-345664 | 12/2000 |
| JP | 2001-144314 | 5/2001 |
| JP | 2004-251037 | 9/2004 |
| JP | 2005-526202 A | 9/2005 |
| JP | 2010-242367 | 10/2010 |
| JP | 2011-236609 | 11/2011 |
| JP | 2011-236611 | 11/2011 |
| JP | 4829259 B2 | 12/2011 |
| JP | 2012-001908 | 1/2012 |
| JP | 2012-001909 | 1/2012 |
| JP | 4856279 B1 | 1/2012 |
| JP | 2012-36595 | 2/2012 |
| JP | 2012-102544 | 5/2012 |
| JP | 2012-122490 | 6/2012 |
| JP | 2012-144939 | 8/2012 |
| KR | 2011-0058294 | 6/2011 |
| WO | WO 03/098126 A1 | 11/2003 |
| WO | WO 2010/056464 A1 | 5/2010 |
| WO | WO 2010/112049 A1 | 10/2010 |
| WO | WO 2011/085786 A2 | 7/2011 |
| WO | WO 2011/119245 | 9/2011 |
| WO | WO 2011/139660 A1 | 11/2011 |
| WO | WO 2012/019907 A1 | 2/2012 |
| WO | 2012/079061 A1 | 6/2012 |

OTHER PUBLICATIONS

International Search Report and Written Opinion mailed Apr. 7, 2015, issued in International Application No. PCT/US2014/070369 filed Dec. 15, 2014, 13 pages.
International Search Report and Written Opinion mailed May 22, 2015, issued in International Application No. PCT/US2015/017444 filed Feb. 25, 2015, 12 pages.
Japanese Office Action issued on Oct. 30, 2018 in Patent Application No. 2016-520033 (with English translation), 7 pages.
Second Office Action issued May 15, 2018, in CN 2014800688804. English translation provided. 4pg.
Examination Report No. 1 issued Mar. 2, 2018 in Australian Patent Application No. 2014370205, 5 pages.
Japanese Office Action for corresponding JP2016-520033, issued Jul. 2, 2019. English translation provided.

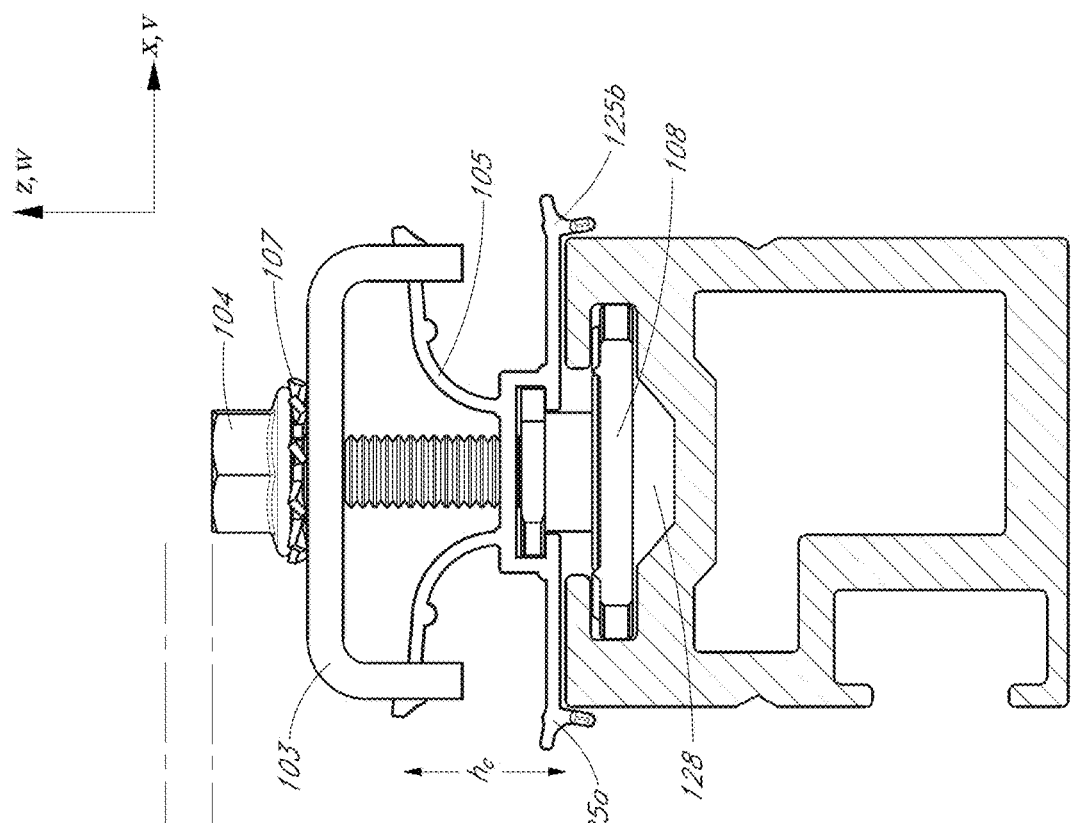
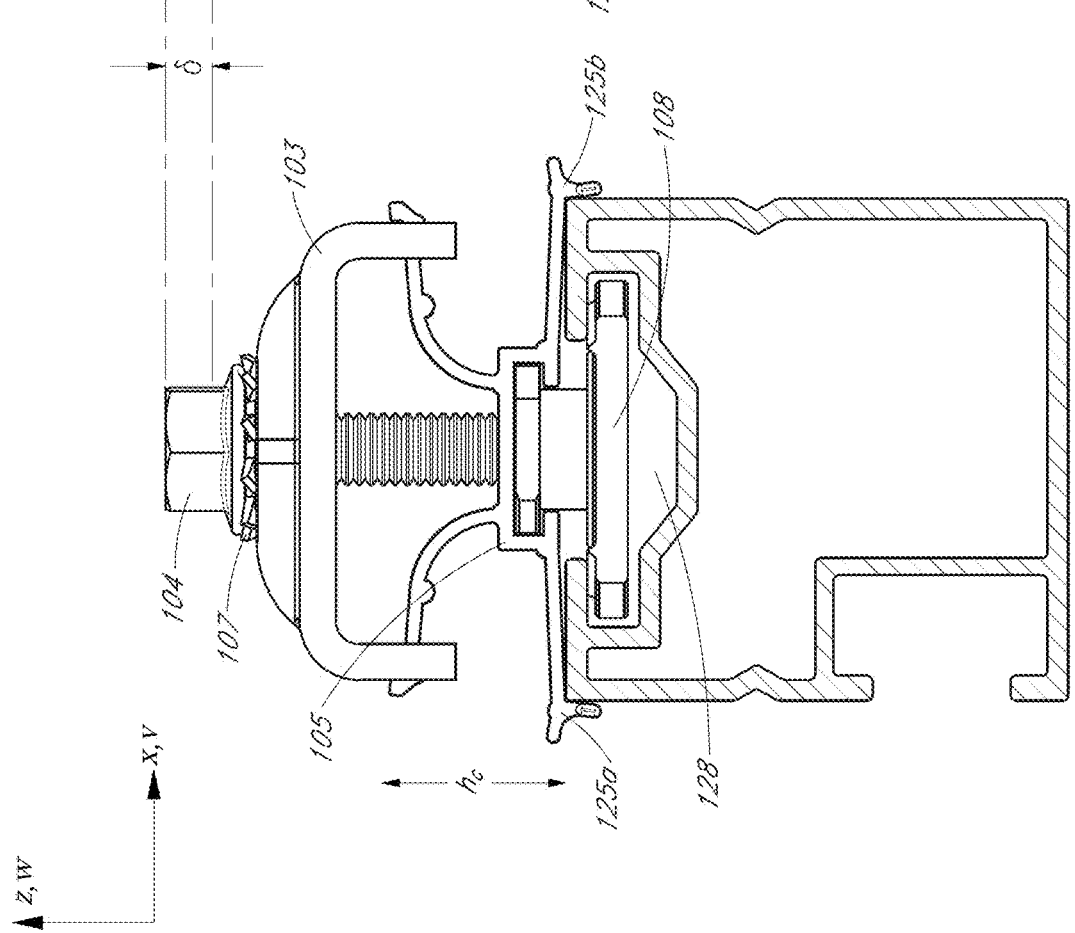
FIG. 9E
FIG. 9D

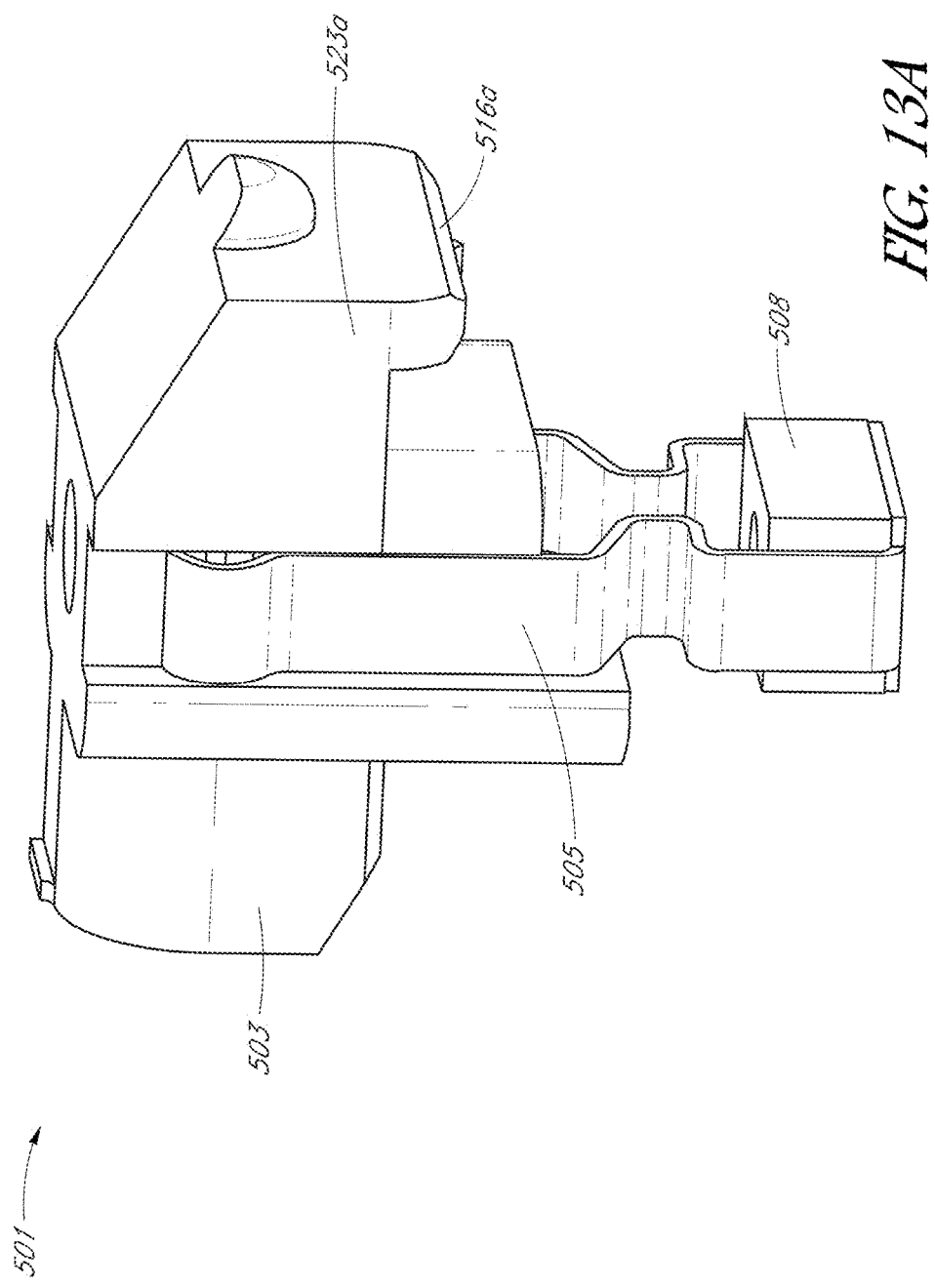

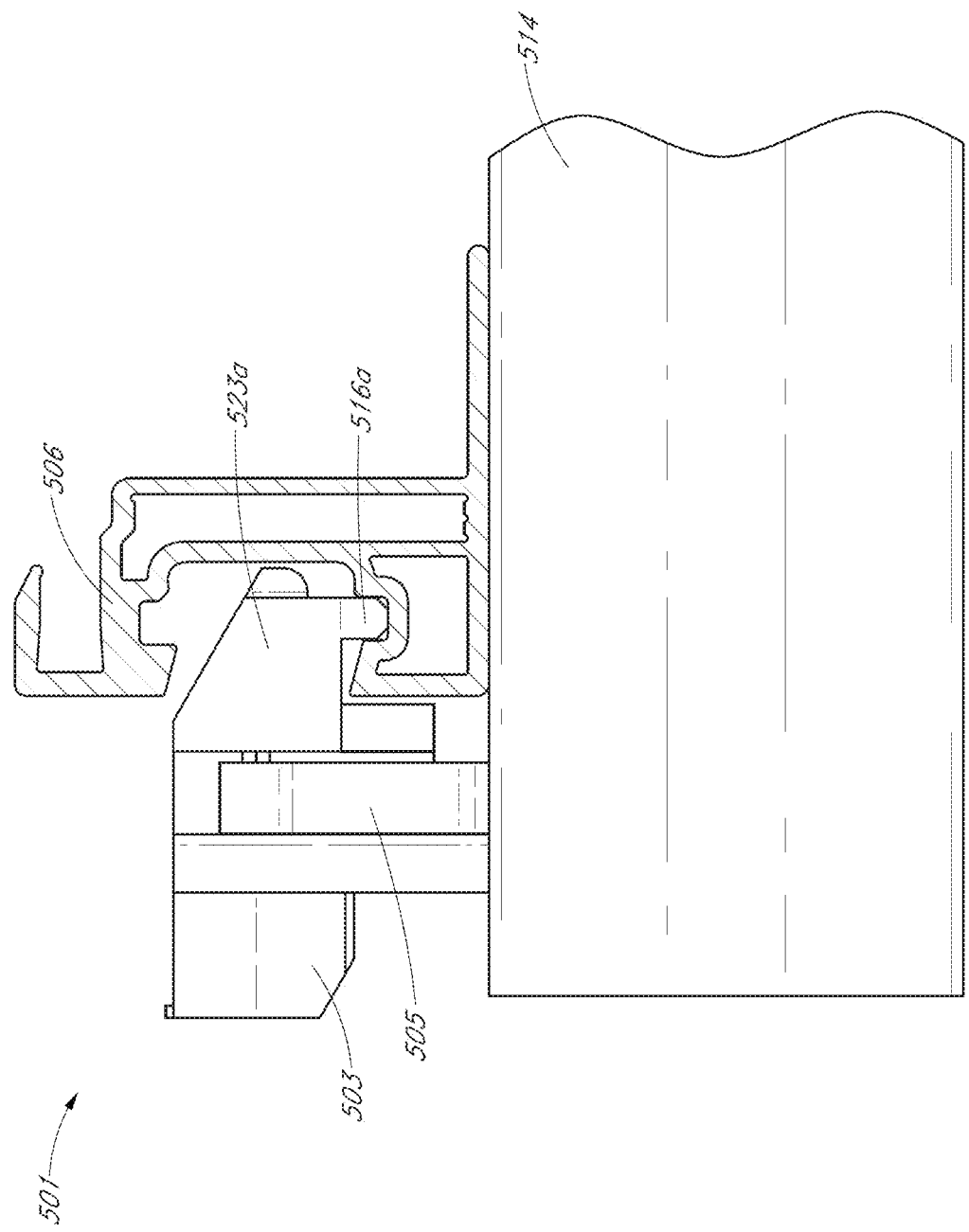

CLAMPS FOR SOLAR SYSTEM

CROSS-REFERENCE TO RELATED APPLICATIONS

This application is a continuation of and claims priority to U.S. application Ser. No. 17/447,264, filed Sep. 9, 2021, which is a continuation of U.S. application Ser. No. 16/864,736, filed May 1, 2020 (now U.S. Pat. No. 11,121,668, Sep. 14, 2021), which is a continuation of U.S. application Ser. No. 16/537,165, filed Aug. 9, 2019 (now U.S. Pat. No. 10,680,548, issued Jun. 9, 2020), which is a continuation of U.S. application Ser. No. 15/383,757, filed Dec. 19, 2016 (now U.S. Pat. No. 10,432,133, issued Oct. 1, 2019), which is a continuation of U.S. application Ser. No. 14/139,755, filed Dec. 23, 2013 (now U.S. Pat. No. 9,531,319, issued Dec. 27, 2016). The benefit of priority is claimed to each of the foregoing, and the entire contents of each of the foregoing are incorporated herein by reference.

BACKGROUND

Technical Field

Embodiments of the subject matter described herein relate generally to improved clamps for solar systems, such as clamps for mounting solar modules to a mounting structure.

Description of the Related Art

Solar power has long been viewed as an important alternative energy source. To this end, substantial efforts and investments have been made to develop and improve upon solar energy collection technology. Of particular interest are residential-, industrial- and commercial-type applications in which relatively significant amounts of solar energy can be collected and utilized in supplementing or satisfying power needs. One way of implementing solar energy collection technology is by assembling an array of multiple solar modules.

One type of solar energy system is a solar photovoltaic system. Solar photovoltaic systems ("photovoltaic systems") can employ solar panels made of silicon or other materials (e.g., III-V cells such as GaAs) to convert sunlight into electricity. Photovoltaic systems typically include a plurality of photovoltaic (PV) modules (or "solar tiles") interconnected with wiring to one or more appropriate electrical components (e.g., switches, inverters, junction boxes, etc.).

A typical conventional PV module includes a PV laminate or panel having an assembly of crystalline or amorphous semiconductor devices ("PV cells") electrically interconnected and encapsulated within a weather-proof barrier. One or more electrical conductors are housed inside the PV laminate through which the solar-generated current is conducted.

Regardless of an exact construction of the PV laminate, most PV applications entail placing an array of solar modules at the installation site in a location where sunlight is readily present. This is especially true for residential, commercial or industrial applications in which multiple solar modules are desirable for generating substantial amounts of energy, with the rooftop of the structure providing a convenient surface at which the solar modules can be placed.

In some arrangements, solar modules are placed side-by-side in an array. Each solar module can be mounted to a support structure, such as a roof, by coupling the module to a mounting structure (e.g., a rail) by way of a coupling member (e.g., a clamp, clip, anchor or mount). It can be challenging to couple modules side-by-side because the array assembler typically engages the coupling member while also ensuring that adjacent modules are positioned properly on the mounting structure. Accordingly, there remains a continuing need for improved systems and methods for mounting solar modules to a support structure.

SUMMARY

In one embodiment, a clamp assembly having a major axis is disclosed. The clamp assembly can include an upper clamp member and a lower clamp member. The clamp assembly can further include a stabilization member having a relaxed state and one or more compressed states. The stabilization member can be configured to prevent rotation of the lower clamp member relative to the upper clamp member about the major axis. The stabilization member in the relaxed state can be biased to support at least the weight of the upper clamp member to prevent translation of the upper clamp member towards the lower clamp member along the major axis.

In another embodiment, a solar power system is disclosed. The solar power system can comprise a rail and a solar module disposed on the rail. The solar power system can include a clamp assembly coupling the solar module to the rail. The clamp assembly can have a clamped configuration in which the solar module is secured to the rail and an unclamped configuration. The clamp assembly can comprise an upper clamp member, a lower clamp member coupled to the rail, and a stabilization member mechanically engaging the upper clamp member and the lower clamp member. The stabilization member can prevent rotation of the lower clamp member relative to the rail when the clamp assembly is in the clamped and unclamped configurations. When the clamp assembly is in the unclamped configuration, the stabilization member can be biased such that the upper clamp member is disposed at a sufficient clearance above the rail to permit the insertion of the solar module between the upper clamp member and the rail.

In yet another embodiment, a method of mounting a solar array to a support structure is disclosed. The method can include mounting a rail to the support structure. The method can further include positioning a first solar module on the rail. A clamp assembly can be coupled to the rail. The clamp assembly can comprise an upper clamp member, a lower clamp member coupled to the rail, and a stabilization member biased such that the upper clamp member is disposed above the rail by a clearance. The stabilization member can prevent rotation of the lower clamp member relative to the upper clamp member. The method can further comprise disposing the first solar module in the clearance between the upper clamp member and the rail. The upper clamp member can be translated towards the rail to clamp an edge portion of the first solar module between the upper clamp member and the rail.

In another embodiment, a solar power system is disclosed. The solar power system can comprise a rail having a groove extending along a length of the rail. The groove can define an aperture between a first ledge and a second ledge. The first ledge can have a first rib extending along the length of the rail from the first ledge towards a recess of the groove. A lower clamp member can have a lower body disposed in the recess of the groove. The lower body can have an arcuate contact ridge facing the first rib. When the lower clamp member is clamped against the rail, the first rib and the arcuate contact ridge engage to form an electrical pathway between the lower clamp member and the rail.

In another embodiment, a method for grounding a solar power system is disclosed. The method can comprise inserting a lower clamp member into a groove of a rail. The groove can extend along a length of the rail. The lower clamp member can comprise an arcuate contact ridge. The rail can comprise one or more ribs extending towards the lower clamp member. The method can comprise clamping the lower clamp member to the rail such that the arcuate contact ridge engages the one or more ribs to create one or more electrical connections between the lower clamp member and the rail.

In yet another embodiment, a solar power system is disclosed. The solar power system can comprise a plurality of solar modules. A plurality of skirt clips can be coupled to the solar modules. One or more skirt segments can be coupled to the solar modules by way of the skirt clips.

In another embodiment, a skirt clip adapted to couple a skirt to a solar array is disclosed. The skirt clip can comprise a generally Z-shaped member. The generally Z-shaped member can comprise an upper portion and a lower portion. The generally Z-shaped member can comprise a connecting portion that connects the upper and lower portions. The connecting portion can connect an end of the upper portion with an opposing end of the lower portion.

In yet another embodiment, a method of coupling a skirt to an array of solar modules is disclosed. The method can comprise forming an array of solar modules. The method can further comprise snapping a plurality of skirt clips to frames of the solar modules. The method can comprise snapping skirt segments to the plurality of skirt clips to couple the skirt segments to the solar modules.

All of these embodiments are intended to be within the scope of the disclosure. These and other embodiments will become readily apparent to those skilled in the art from the following detailed description of embodiments having reference to the attached figures.

BRIEF DESCRIPTION OF THE DRAWINGS

These aspects and others will be apparent from the following description of various embodiments and the accompanying drawing, which is meant to illustrate and not to limit the disclosure, wherein:

FIG. 9D is a side elevational view of the clamp assembly coupled to the rail in an unclamped configuration.

FIG. 9E is a side elevational view of the clamp assembly coupled to the rail in a clamped configuration.

FIG. 13A is a perspective view of a clamp assembly comprising a hook-and-swing mechanism, according to one embodiment.

FIG. 13C is a side elevational view of the clamp assembly of FIGS. 13A-13B coupled to a rail.

DETAILED DESCRIPTION

Figure 1:
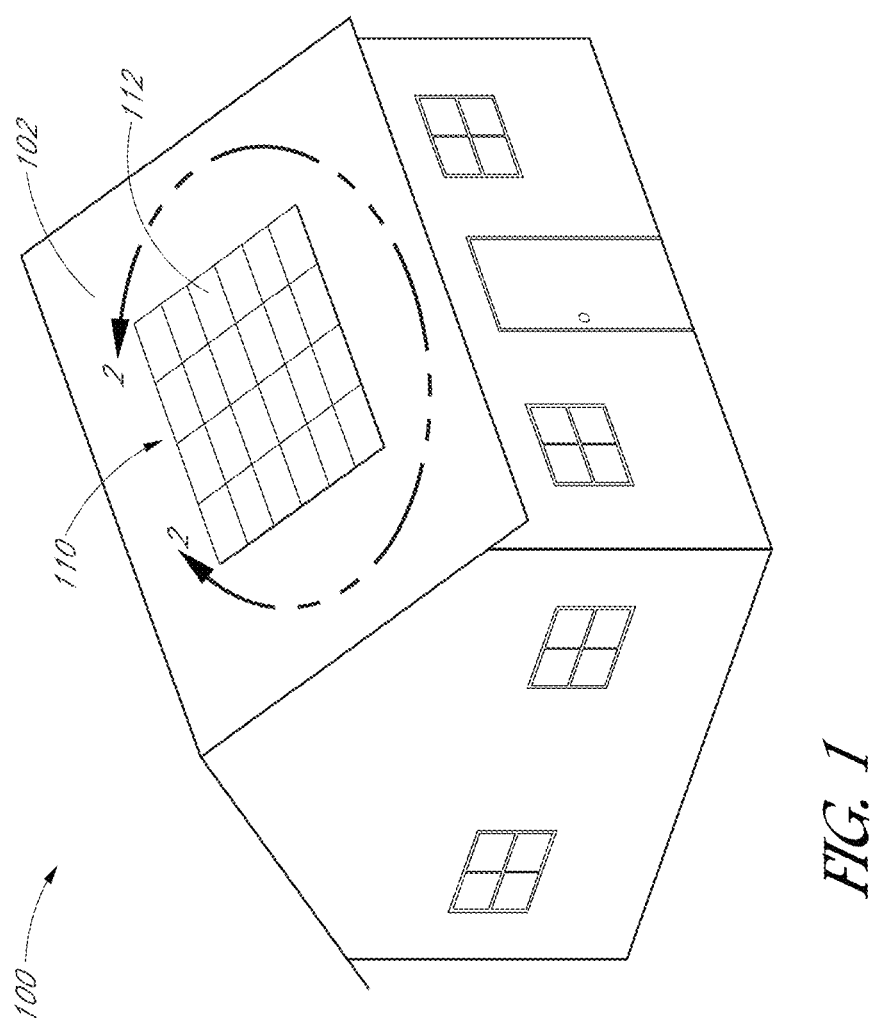
FIG. 1 is a schematic perspective view of a solar power system comprising an array of solar modules mounted to a support structure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" solar module does not necessarily imply that this solar module is the first solar module in a sequence; instead the term "first" is used to differentiate this solar module from another solar module (e.g., a "second" solar module).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

The embodiments disclosed herein are often described in the context of photovoltaic arrays and modules. However, these embodiments can be used in other contexts as well, such as concentrated PV systems, thermal solar systems, etc.

Various embodiments disclosed herein relate to mounting an array of solar modules to a support structure, such as a roof. For example, a mounting structure, such as a rail, can be attached to the roof or other support structure by way of one or more roof anchors. Solar modules can be positioned atop the rails adjacent to one another and can be coupled to the rails by way of a coupling member, such as a clamp assembly. When coupling adjacent solar modules to the rails, an assembler may encounter various challenges. For example, the assembler may attempt to align two adjacent solar modules on the rails, while simultaneously manipulating the clamp assembly to clamp the two solar modules to the rails. In some arrangements, it can be challenging to manipulate the clamp assembly while also positioning the solar modules relative to one another and the rail.

Accordingly, various embodiments disclosed herein are configured to assist an assembler in constructing an array. For example, in some embodiments, a stabilization member is provided to resist or prevent relative rotation between an upper clamp member and a lower clamp member of the clamp assembly. The stabilization member can be compressible, and can have a relaxed state and one or more compressible states. In the relaxed state, the stabilization member can be biased to support at least the weight of the upper clamp member to prevent translation of the upper clamp member towards the lower clamp member relative to the relaxed state. The stabilization member can create a clearance between the upper clamp member and the rail when the clamp assembly is in an unclamped configuration. The clearance can enable an assembler to insert an edge portion of the solar module within the clearance between the upper clamp member and the rail. The assembler can then engage a fastener to translate the upper clamp member towards the rail and the lower clamp member to clamp the solar module to the rail.

Besides maintaining the clearance between the upper clamp member and the rail (and lower clamp member), the stabilization member can also maintain rotational alignment between the lower clamp member and the upper clamp member. For example, the lower clamp member can include an upper locking nut and a lower body member. The stabilization member can resist or prevent rotation between the lower body member and the upper clamp member such that when the lower body member is inserted within a groove of the rail, an aperture of the rail locks the lower body member in the groove.

In some embodiments, the rail can comprise an elongated piece of extruded metal. The rail can include a groove having an aperture defined by first and second ledges. In some embodiments, each ledge can include a rib extending downwardly from the ledges towards a recess of the groove. The rib can include a sharpened distal edge in some embodiments. When the lower body member of the lower clamp member is disposed in the recess of the groove, the rib can mechanically and electrically engage with an arcuate contact ridge of the lower clamp member when the lower body member is clamped against the rail. The contact ridge can assist in forming an electrical pathway between the lower clamp member and the rail. In some embodiments disclosed herein, multiple ribs can be provided in each ledge such that multiple electrical pathways are formed between the lower clamp member and the rail. By enabling multiple electrical pathways, the embodiments disclosed herein can improve the degree of electrical grounding for the solar power system.

In yet other embodiments, a skirt clip is disclosed. The skirt clip can be configured to clip a skirt to a frame of a solar module. Optionally, the skirt clip can be configured to clip to a frame without additional brackets or braces. For example, the skirt clip can comprise a Z-shaped clip having notches along upper and lower portions of the clip. The notches can engage with corresponding lips of the solar module and the skirt. By enabling module-level coupling between the skirt and the solar array, the skirt clip can assist in assembling the skirt about a perimeter of the array to hide components underneath the array.

Figure 2:
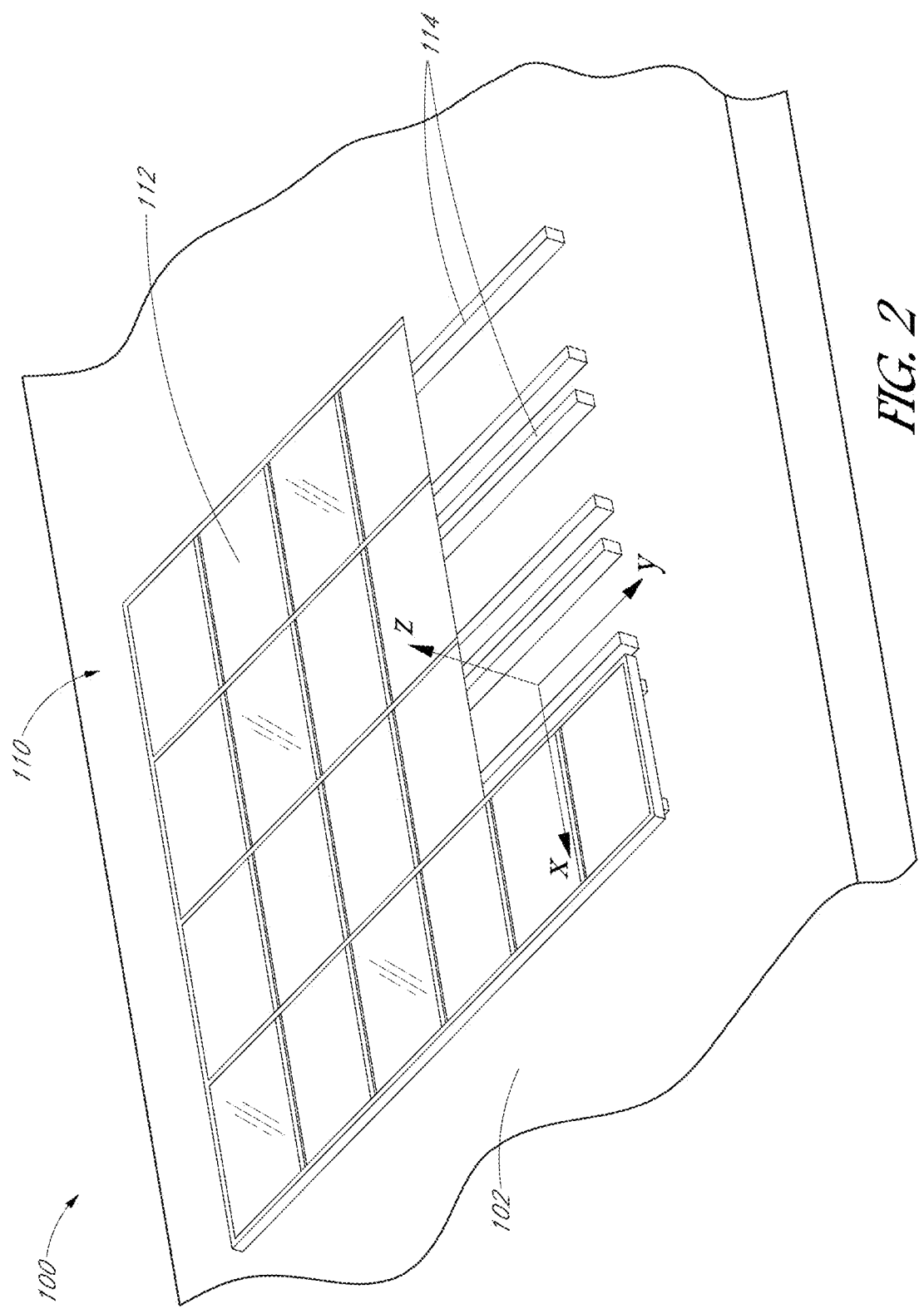
FIG. 2 is a magnified perspective view of the solar power system illustrated in FIG. 1.

FIG. 1 is a schematic perspective view of a solar power system 100 comprising an array 110 of solar modules 112 mounted to a support structure 102. FIG. 2 is a magnified perspective view of the solar power system 100 illustrated in FIG. 1. The system 100 of FIGS. 1-2 is illustrated as being coupled to a support structure 102 that comprises a roof of a building, such as a residential, commercial, industrial structure, etc.

The solar module 112 can include a photovoltaic (PV) laminate or panel having an assembly of crystalline or amorphous semiconductor devices ("PV cells") electrically interconnected and encapsulated within a weather-proof barrier that includes a frame. The solar modules 112 can be mounted on and coupled to spaced apart rails 114 that extend across the support structure 2. The rails 114 can mechanically couple to the support structure 2 by way of an anchor in some embodiments.

As shown in FIG. 2, a global x-y-z coordinate system can be defined across the support structure 2. For example, the rails 114 can extend along a length in the y-direction, and the array 110 can be positioned atop the rails 114 in the x-y plane. As used herein, the x-y-z coordinate system shown in FIG. 2 defines a global frame of reference for the solar modules 112 and other components disclosed herein.

Figure 3:
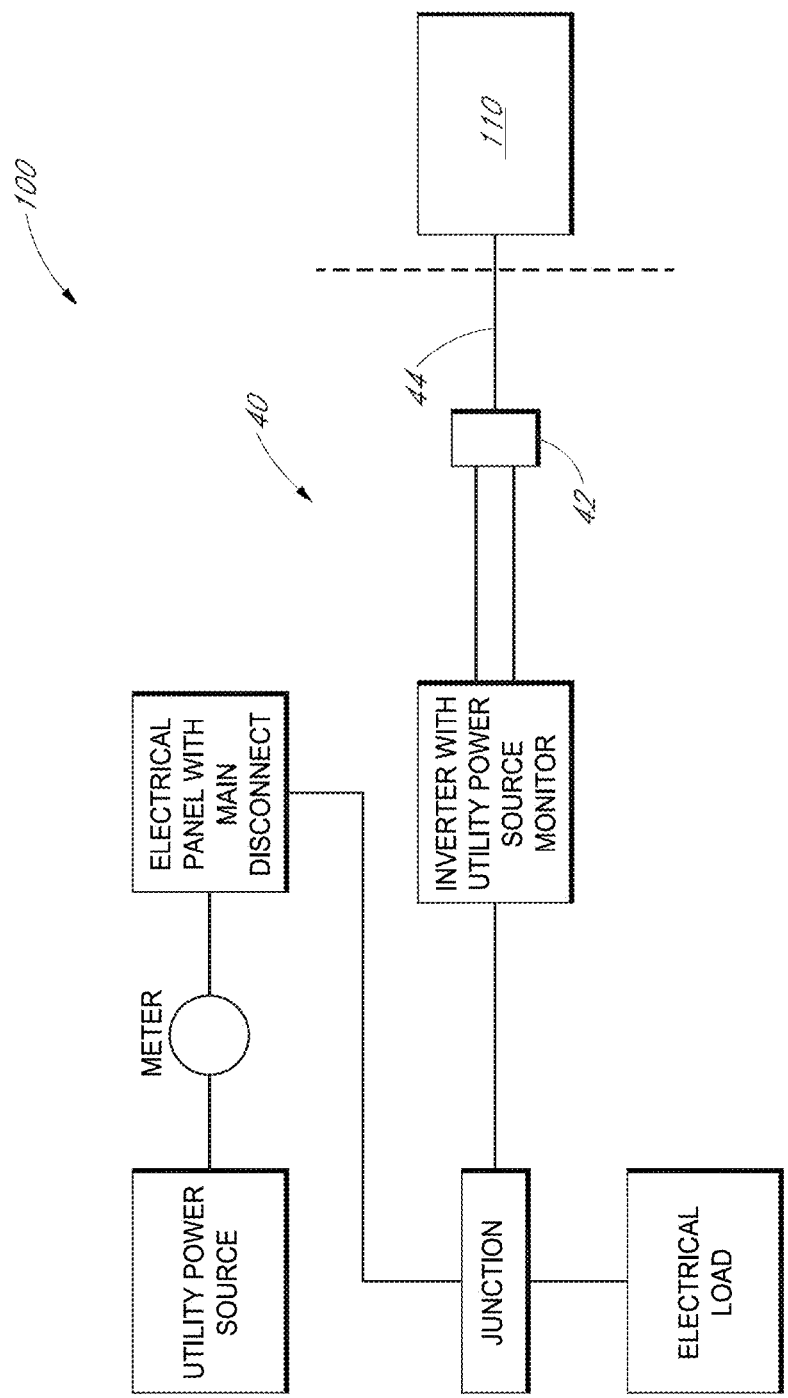
FIG. 3 is a schematic diagram of an optional electrical system connected to the array.

FIG. 3 is a schematic diagram of an optional electrical system 40 connected to the array. The solar power system 100 can be incorporated into the electrical system 40 connected to the array 110. For example, the electrical system 40 can include the array 110 as a power source connected to a remote connection device 42 with power lines 44. The electrical system 40 can also include a utility power source, a meter, an electrical panel with a main disconnect, a junction, electrical loads, and/or an inverter with the utility power source monitor. The electrical system 40 can be configured and can operate in accordance with the descriptions set forth in U.S. patent application Ser. No. 12/371,315, to Peurach et al., published as U.S. Patent Publication No. 2010/0071744, and entitled "Photovoltaic Installation with Automatic Disconnect Device." the entire contents of which are hereby expressly incorporated by reference in its entirety for all purposes.

Figure 4B:
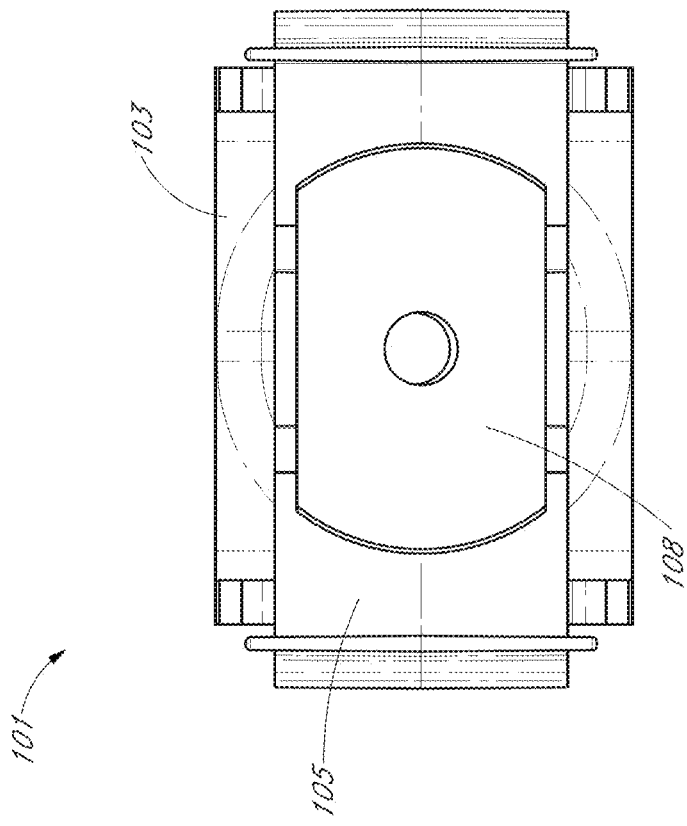
FIG. 4B is a bottom plan view of the clamp assembly of FIG. 4A.
Figure 4A:
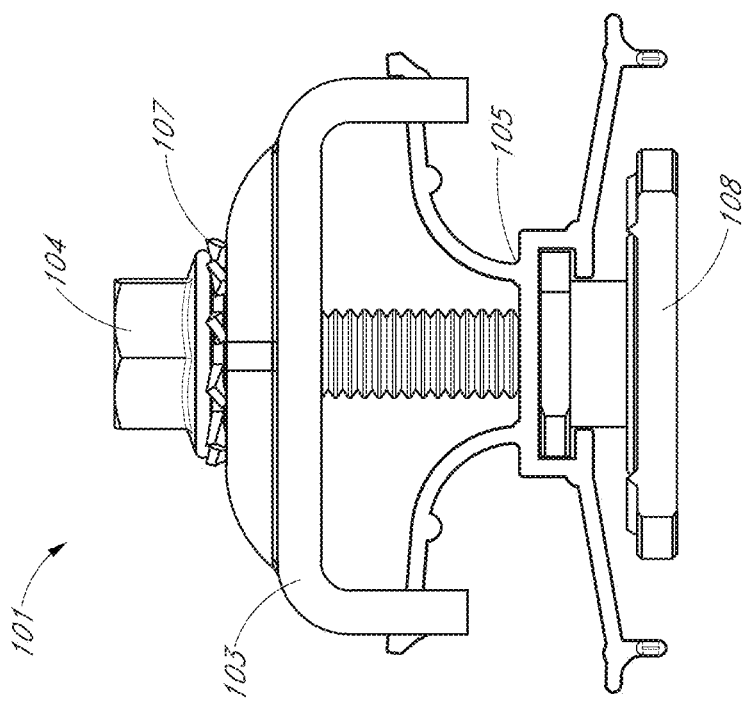
FIG. 4A is a side elevational view of a clamp assembly, according to one embodiment.
Figure 5:
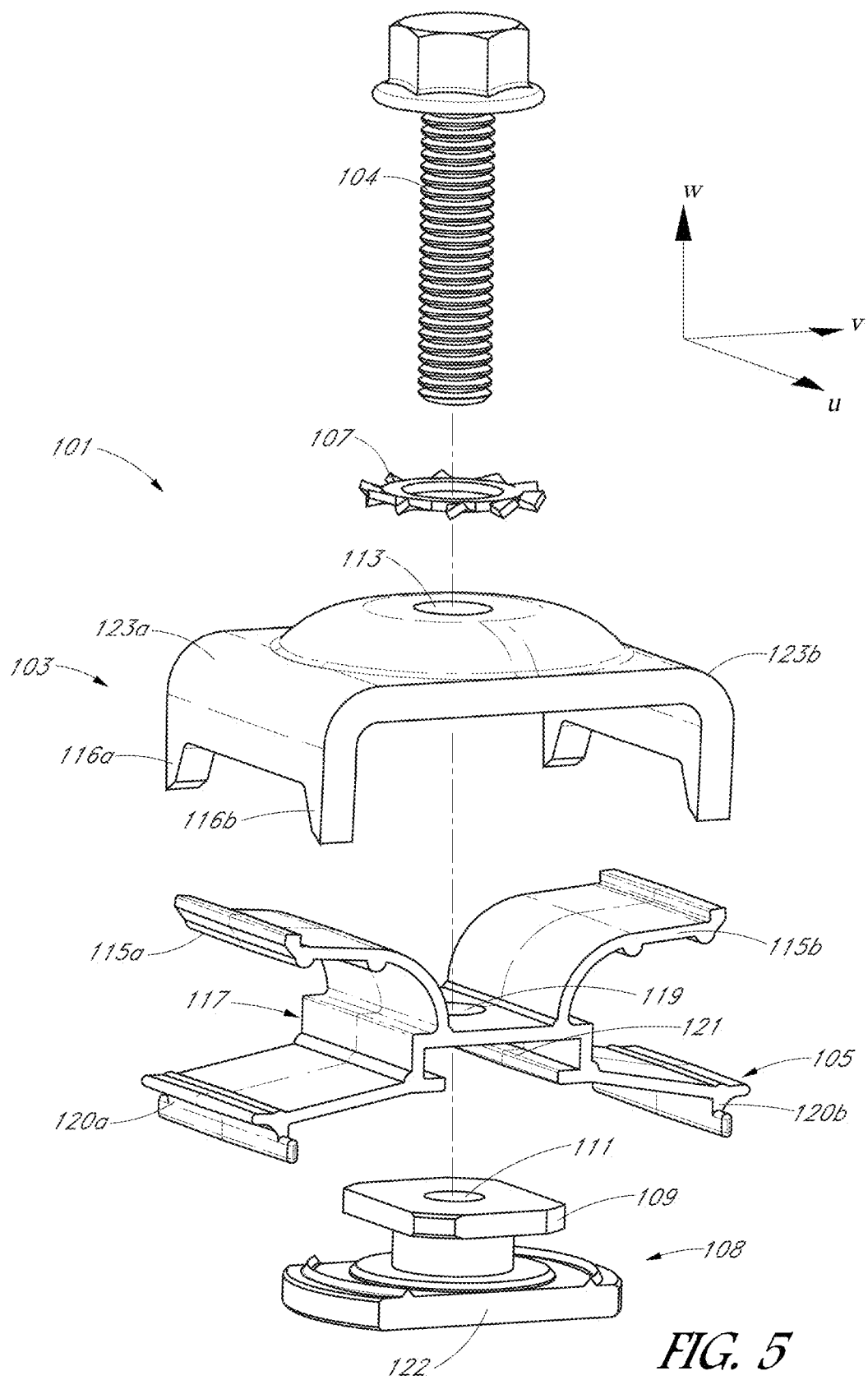
FIG. 5 is an exploded perspective view of the clamp assembly of FIG. 4A.

FIG. 4A is a side elevational view of a clamp assembly 101, according to one embodiment. As explained herein, the clamp assembly 101 can couple adjacent solar modules 112 to rails 114, e.g., between adjacent modules 112. In other embodiments, the clamp assembly 101 can be disposed at an outer end of the array 110 such that the clamp assembly 101 only couples to one module 12 along a perimeter of the array 110. FIG. 4B is a bottom plan view of the clamp assembly 101 of FIG. 4A. FIG. 5 is an exploded perspective view of the clamp assembly 101 of FIGS. 4A-4B. As explained above, it can be advantageous to provide a clamp assembly in which the assembler can align and secure adjacent solar modules to the frame.

As shown in FIGS. 4A-5, the clamp assembly 101 can include an upper clamp member 103 and a lower clamp member 108. A stabilization member 105 can be disposed between the upper clamp member 103 and the lower clamp member 108. A fastener 104 can extend between the upper clamp member 103 and the lower clamp member 108.

For example, the fastener 104 can extend through a washer 107, an opening 113 of the upper clamp member 103, an opening 119 of the stabilization member 105, and into an opening 111 of the lower clamp member 108. The fastener 104 can comprise any suitable threaded fastener, such as a bolt. The fastener 104 can threadably engage with the lower clamp member 108 in some embodiments such that rotation of the fastener 104 relative to the lower clamp member 108 causes the fastener 104 to clamp downwards and towards the lower clamp member 108.

As shown in FIG. 5, a local u-v-w coordinate system can be used to describe the orientation of the clamp assembly 101. In general, the local w coordinate can correspond to the global z coordinate. The w-axis can represent a major axis of the clamp assembly 101. The u-axis can represent a lateral axis representative of width, and the v-axis can represent a longitudinal axis representative of length.

Figure 6A:
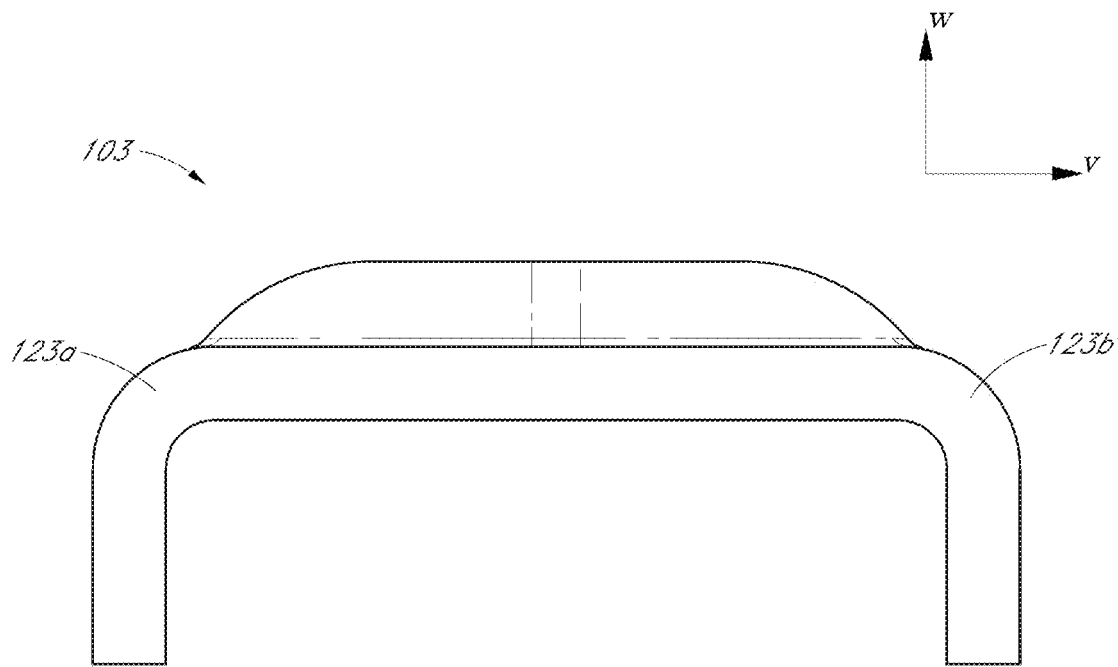
FIG. 6A is a side elevational view of an upper clamp member, according to one embodiment.
Figure 6B:
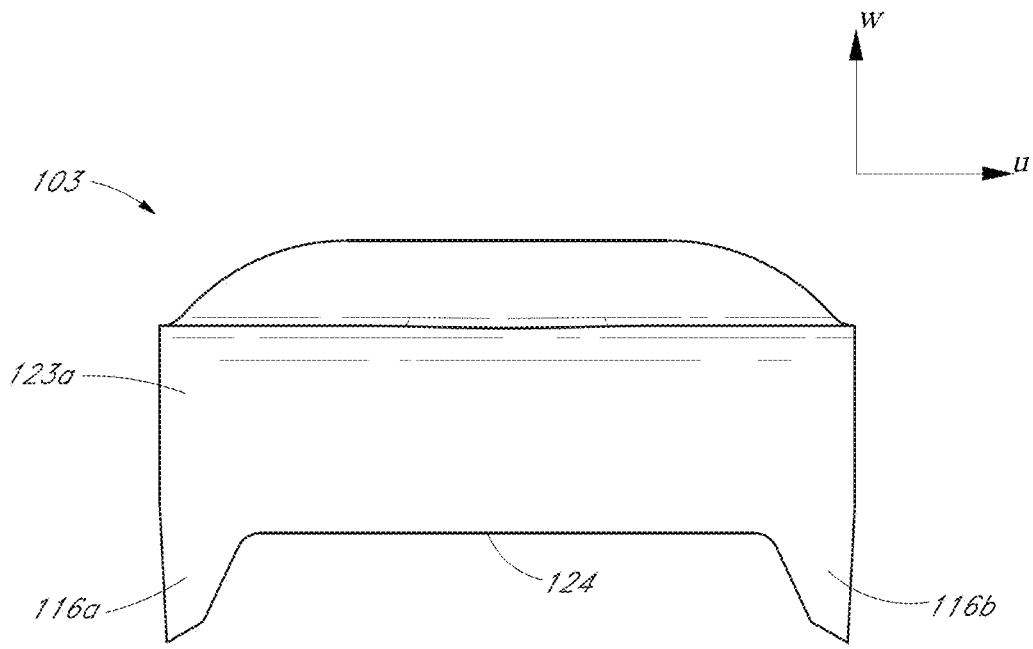
FIG. 6B is an orthogonal side elevational view of the upper clamp member illustrated in FIG. 6A.

FIG. 6A is a side elevational view of the upper clamp member 103, according to one embodiment. FIG. 6B is an orthogonal side elevational view of the upper clamp member 103 illustrated in FIG. 6A. With reference to FIGS. 5 and 6A-6B, the fastener 104 can extend through the opening 113 of the upper clamp member 103. The upper clamp member 103 can include a first arm 123a and a second arm 123b extending outwardly from the major axis w along the longitudinal axis v.

A first projection 116a or tooth and a second projection 116b or tooth can extend from a distal portion of each arm 123a, 123b. The projections 116a, 116b can extend downwardly along the major axis w towards the lower clamp member 108. As shown in FIG. 6B, the first projection 116a and the second projection 116b can be spaced apart along the lateral axis u to form a support edge 124. As explained below with respect to FIG. 7, the stabilization member 105 can mechanically levitate the upper member 103 by supporting the upper clamp member 103 along the support edge 124. As explained herein, the projections 116, 116b can be configured to secure a solar module to a mounting structure such as a rail 114. Although the upper clamp member 103 shown in FIGS. 6A-6B includes projections 116a, 116b extending from arms 123a, 123b, in other embodiments, the upper clamp member 103 may not include any projections. For example, in some embodiments (see, e.g., FIG. 12), the upper clamp member can include arms extending from a central body, and the arms can be clamped downwardly against an upper or other surface of a solar module 112. In other embodiments, the clamp member 103 may only couple to solar modules 112 along the perimeter of the array 110, e.g., the clamp member 103 can comprise an end clamp that clamps outer modules 112 to the rail or other mounting structure.

Figure 7:
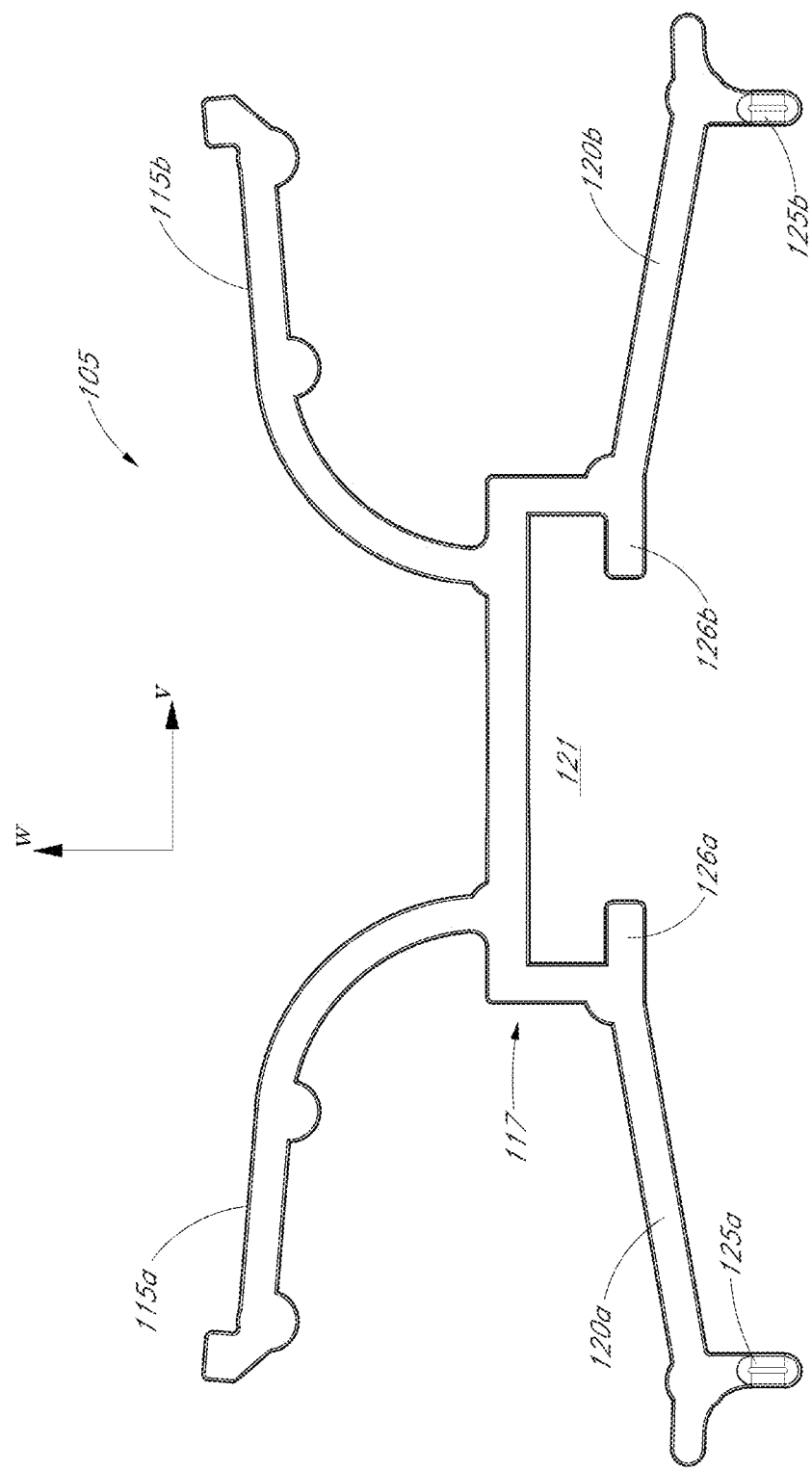
FIG. 7 is a side elevational view of a stabilization member, according to one embodiment.

FIG. 7 is a side elevational view of the stabilization member 105, according to one embodiment. The stabilization member 105 can be compressible, such that the stabilization member 105 includes a relaxed state and one or more compressed states. In the relaxed state, the stabilization member 105 can be biased outwardly along the major axis w. In the compressed state(s), stabilization member 105 can be compressed inwardly along the major axis w. The stabilization member 105 can be constructed of a plastic, such as a polyvinyl chloride (PVC) or any other suitable polymer.

In some embodiments, the stabilization member 105 can be extruded along the lateral axis u. By using an extruded stabilization member 105, simplified methods of construction can be enabled. For example, a complex or otherwise arbitrary cross-section can be defined, and the stabilization member 105 can be extruded to form the final three-dimensional structure. The stabilization member 105 of FIG. 7 is shown in the relaxed state, in which there are no or minimal external forces applied to the stabilization member 105.

With reference to FIGS. 5-7, the stabilization member 105 can define a generally X-shaped cross-section. For example, the stabilization member 105 can include a central portion 117 having a first upwardly-extending flange 115a and a second upwardly-extending flange 115b.

As shown in Figure 5, the upwardly-extending flanges 115a, 115b can be configured to support the first and second arms 123a, 123b of the upper clamp member 103, e.g., at the support edge 124 (see FIGS. 5-6B). The first and second arms 123a, 123b and corresponding projections 116a, 116b can prevent rotation of the stabilization member 105 relative to the upper clamp member 103. As explained herein, the stabilization member 105 can also prevent relative rotation between the stabilization member 105 and the lower clamp member 108. The stabilization member 105 can accordingly maintain the orientation of the upper clamp member 103 relative to the lower clamp member 108, such that the lower clamp member 108 does not rotate relative to the upper clamp member 103.

A first downwardly-extending flange 120a and a second downwardly-extending flange 120b can extend from the central portion 117. A first distal foot 125a and a second distal foot 125b can extend from distal portions of the downwardly-extending flanges 120a, 120b. The central portion 117 can also include a C-shaped channel 121 facing the lower clamp member 108 (see FIG. 5). The C-shaped channel 121 can define first and second inwardly-extending projections 126a, 126b.

Figure 8:
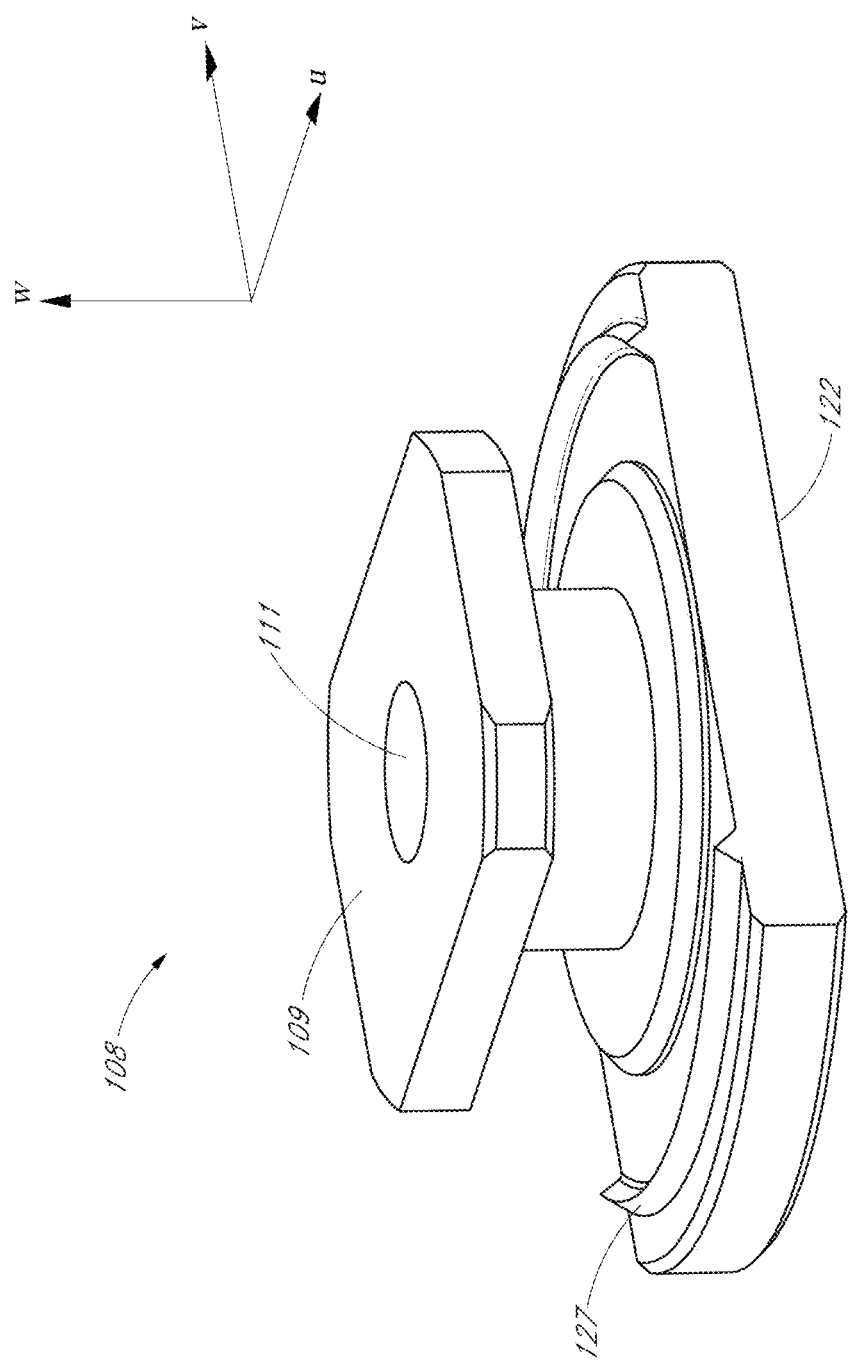
FIG. 8 is a perspective view of a lower clamp member, according to one embodiment.

FIG. 8 is a perspective view of the lower clamp member 108, according to one embodiment. The lower clamp member 108 can comprise an upper locking nut 109 having a threaded opening 111 therethrough. The lower clamp member 108 can also include a lower body member 122 having a length along the longitudinal direction v and a width along the lateral direction u. As shown in FIG. 8, the length of the lower body member 122 along the longitudinal direction v can be larger than a major dimension of the upper locking nut 109, e.g., the largest dimension of the nut 109.

With reference to FIGS. 5 and 7, the C-shaped channel 121 can capture the upper locking nut 109 therein such that the inwardly-extending projections 126a, 126b prevent the upper locking nut 109 from translating out of the channel 121 in the w-direction (the major axis). An arcuate contact ridge 127 can extend upwardly from the lower body member 122. The contact ridge 127 can include a sharp distal edge to enhance mechanical and electrical coupling between the lower body member 122 and the rail 114 to create a grounded electrical pathway between the lower body member 122 and the rail 114.

Figure 9B:
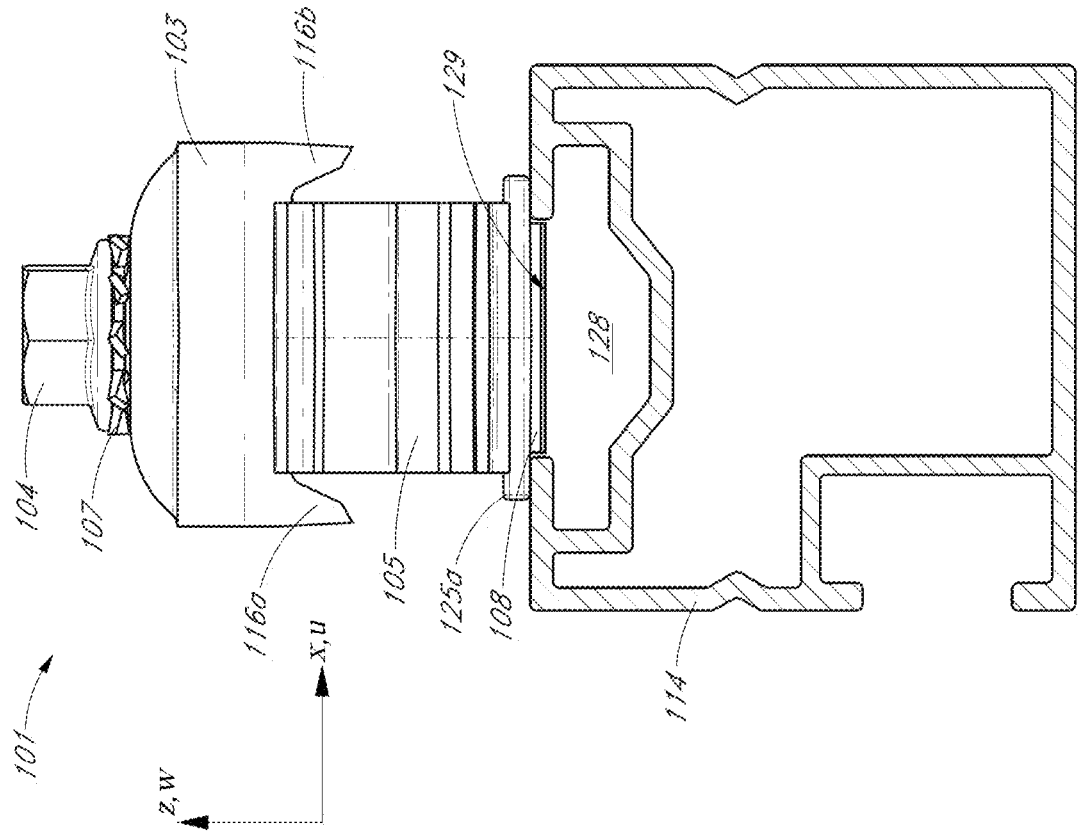
FIG. 9B is a side elevational view of a clamp assembly disposed on the rail in an insertion configuration.
Figure 9A:
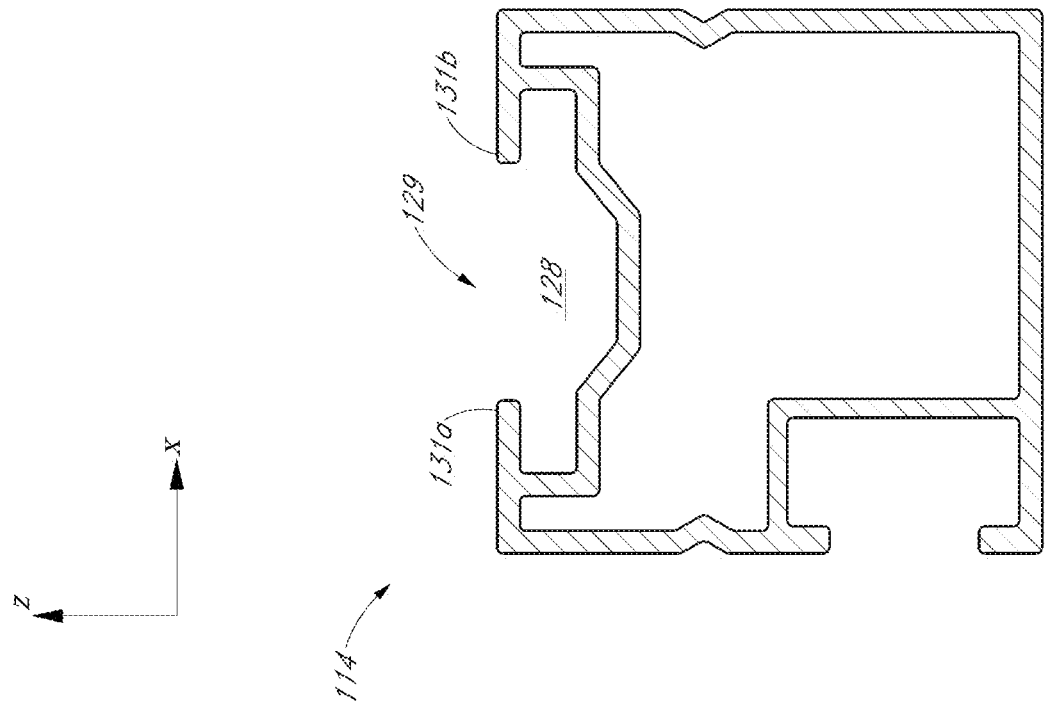
FIG. 9A is a side elevational view of a rail, according to one embodiment.

FIG. 9A is a side elevational view of a rail, according to one embodiment. The rail 114 can include a groove 128 that defines a recess along a length of the rail, e.g., in they-direction. The groove 128 can define an aperture 129 of the rail 114 between a first ledge 131a and a second ledge 131b. With reference to FIGS. 8 and 9A, the length of the lower body member 122 along the longitudinal direction v may be larger than a width of the aperture 129. The width of the lower body member 122 along the lateral direction u may be smaller than the width of the aperture 129 of the rail 114.

Figure 9C:
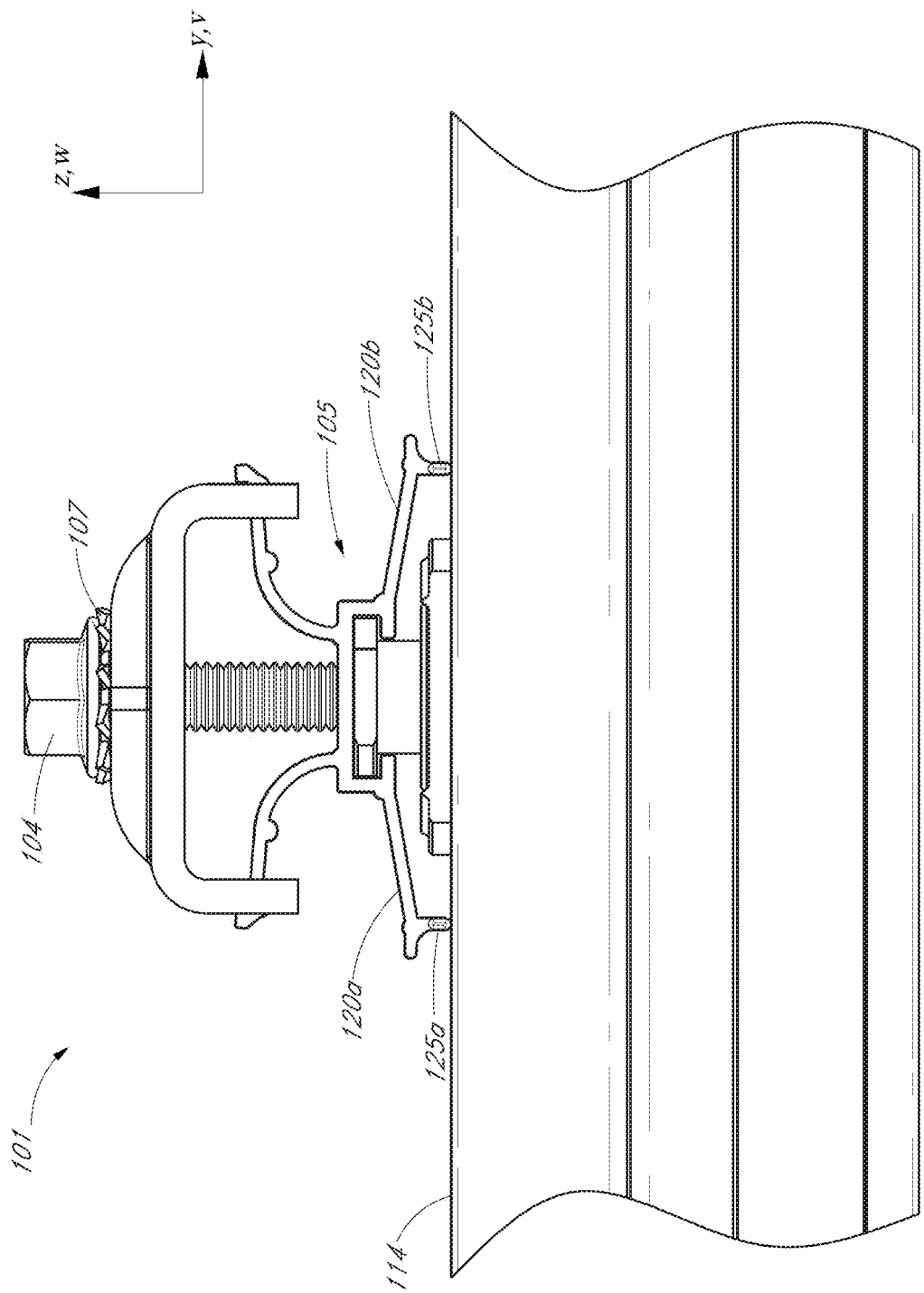
FIG. 9C is an orthogonal side elevational view of the clamp assembly and rail illustrated in FIG. 9B.

FIG. 9B is a side elevational view of the clamp assembly 101 disposed on the rail 114 in an insertion configuration. FIG. 9C is an orthogonal side elevational view of the clamp assembly 101 and rail 114 illustrated in FIG. 9B. In the insertion configuration, the clamp assembly 101 may be inserted into the groove 128 of the rail 114. To insert the lower body member 122 into the recess of the groove 128, the clamp assembly 101 can be aligned relative to the rail 114 such that the lateral axis u of the clamp assembly 101 generally aligns with the aperture 129, e.g., such that the lateral axis u of the clamp assembly 101 aligns with the x-axis of the array 110. As shown in FIG. 9B, the feet 125a, 125b of the stabilization member 105 can rest against a top mounting surface of the rail 114. The width of the lower clamp member 108 can be less than the width of the aperture 129 such that the lower clamp member 108 can be inserted through the aperture 129 and into the groove 128. As shown in FIGS. 9B-9C, the stabilization member 105 is in a relaxed configuration such that the stabilization member 105 supports the weight of the upper clamp member 103. The stabilization member 105 thereby can act to maintain a separation distance or clearance between the upper clamp member 103 and the rail 114.

The clamp assembly 101 in the insertion configuration of FIGS. 9B-9C can be used to initiate the coupling of the clamp assembly 101 to the rail 114. To secure the clamp assembly 101 to the rail 114, the clamp assembly 101 can be rotated by about 90° to place the clamp assembly in an unclamped configuration that prevents vertical translation of the clamp assembly 101 relative to the rail 114 in the z- and w-directions. FIG. 9D is a side elevational view of the clamp assembly 101 coupled to the rail 114 in an unclamped configuration. Upon rotating the clamp assembly 101 by about 90°, the lower clamp member 108 can be disposed in the groove 128 such that the first ledge 131a and the second ledge 131b that define the aperture 129 capture the lower clamp member 108 in the recess of the groove 128. For example, as shown in FIGS. 8 and 9D, the length of the lower body member 122 along the longitudinal v direction can be greater than the width of the aperture 129 (see FIG. 9A). The first and second ledges 131a, 131b of the aperture 129 can capture the lower body member 122 of the lower clamp body 108 to prevent the lower clamp body 108 from translating along the major axis in the w-direction.

In the unclamped configuration, the stabilization member 105 may be in a relaxed state or a slightly compressed state. For example, to rotate the lower body member 122, the stabilization member 105 may be slightly compressed along the w-direction to position the lower body member 122 in the groove 128. In some arrangements, the stabilization member 105 may not be compressed and may be in the relaxed state when in the unclamped configuration. The feet 125a, 125b can help align the upper clamp member 103 (by way of the arms 123a, 123b) to the rail 114. In the unclamped configuration shown in FIG. 9D, the stabilization member 105 can support the upper clamp member 103 at an unclamped clearance height $h_u$ defined between the support edge 124 (FIG. 6B) and the top mounting surface of the rail 114. Thus, in the unclamped configuration, the stabilization member 105 can support at least the weight of the upper clamp member 103.

Figure 9F:
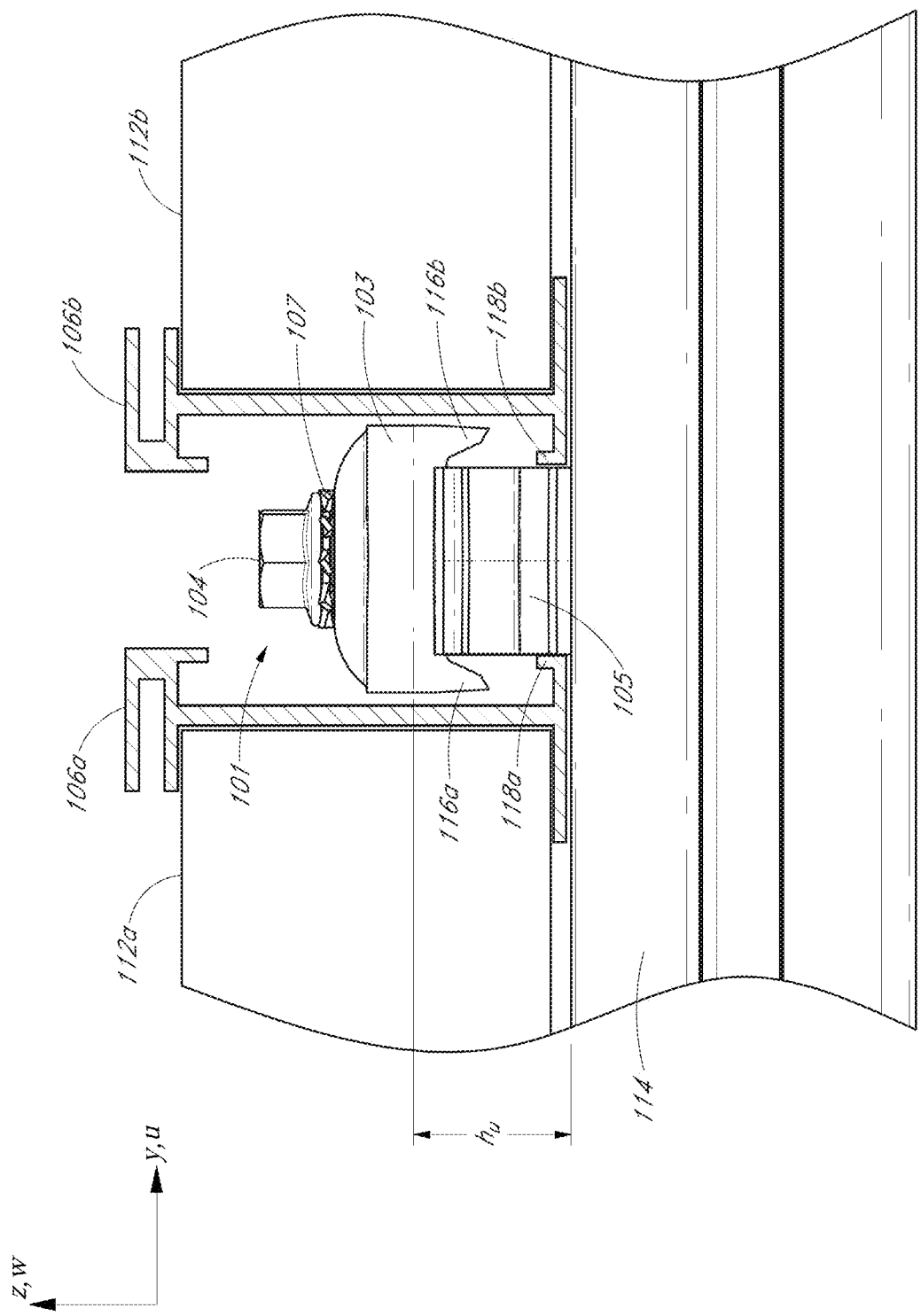
FIG. 9F is an orthogonal side elevational view of the clamp assembly of FIG. 9D in the unclamped configuration.

FIG. 9F is an orthogonal side elevational view of the clamp assembly 101 of FIG. 9D in the unclamped configuration. As shown in FIG. 9F, the clamp assembly 101 can be used to couple two adjacent solar modules 112a, 112b to the rail 114. Each solar module 112a, 112b can include a corresponding frame 106a, 106b around a periphery of the module. The frames 106a, 106b can each include a lip 118a, 118b sized and shaped to engage with the clamp assembly 101. For example in the unclamped configuration of FIG. 9F, the stabilization member 105 can levitate the upper clamp member 103 such that the lips 118a, 118b of the frames 106a, 106b can be inserted through the clearance of the unclamped height $h_u$. Accordingly, in the unclamped configuration, the lateral width u of the clamp assembly 101 can be disposed along the y-direction of the array 110. The unclamped clearance height $h_u$ between the upper clamp member 103 and the rail 114 can allow the assembler to insert the lips 118a, 118b of the modules 112a, 112b underneath the projections 116a, 116b of the upper clamp member 103. Advantageously, the stabilization member 105 can be biased such that the upper clamp member 103 is disposed above the lips 118a, 118b during assembly. The assembler can thereby position adjacent modules 112a, 112b as desired.

Figure 9G:
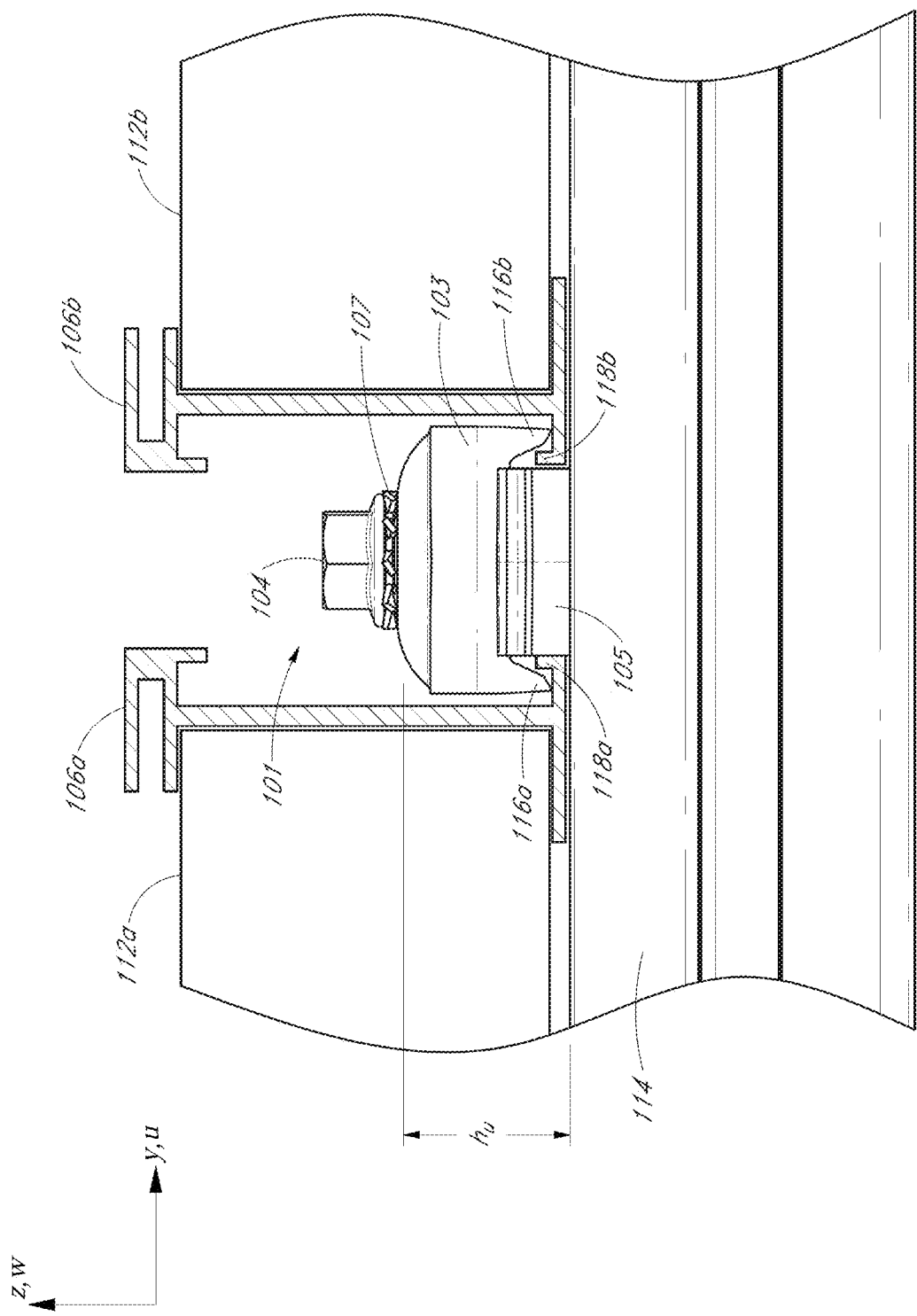
FIG. 9G is an orthogonal side elevational view of the clamp assembly of FIG. 9E in the clamped configuration.

FIG. 9E is a side elevational view of the clamp assembly 101 coupled to the rail 114 in a clamped configuration. FIG. 9G is an orthogonal side elevational view of the clamp assembly 101 of FIG. 9E in the clamped configuration. In the clamped configuration of FIGS. 9E and 9G, the assembly 101 can clamp the upper clamp member 103 against the frame 106a, 106b of the solar module 112a, 112b and the rail 114. For example, the assembler can rotate or otherwise actuate the fastener 104 such that the fastener 104 translates the upper clamp member 103 towards the lower clamp member 108 along the major axis w. Translating the upper clamp member 103 towards the lower clamp member 108 can compress the stabilization member 105 from a relaxed or slightly compressed state to a compressed and/or substantially (or fully) compressed state. When the clamp assembly 101 is in the clamped configuration of FIGS. 9E and 9G, the upper clamp member 103 can be at a clamped height $h_c$ that is lower than the unclamped height $h_u$ shown in FIG. 9D. Indeed, as shown in FIG. 9G, the projections 116a, 116b can capture the corresponding lips 118a, 118b of the frames 106a, 106b of the adjacent modules 112a, 112b against the rail 114. Accordingly, the fastener 104 can be translated by an amount $\delta=h_u-h_c$ to move the clamp assembly 101 from the unclamped configuration to the clamped configuration to secure the solar modules 112a, 112b to the rail 114.

Accordingly, the stabilization member 105 can advantageously act to levitate the upper clamp member 103 at a sufficient unclamped clearance height $h_u$ such that adjacent modules can be inserted between the clamp assembly 101 and the rail 114. In addition, the stabilization member 105 can advantageously maintain a relative orientation between the upper clamp member 103 and lower clamp member 108 such that in the unclamped and clamped configurations, the lower clamp member 108 does not rotate relative to the upper clamp member 103. Advantageously, the stabilization member 105 can also prevent rotation between the lower clamp member 108 and the groove 128 of the rail 114.

Figure 10:
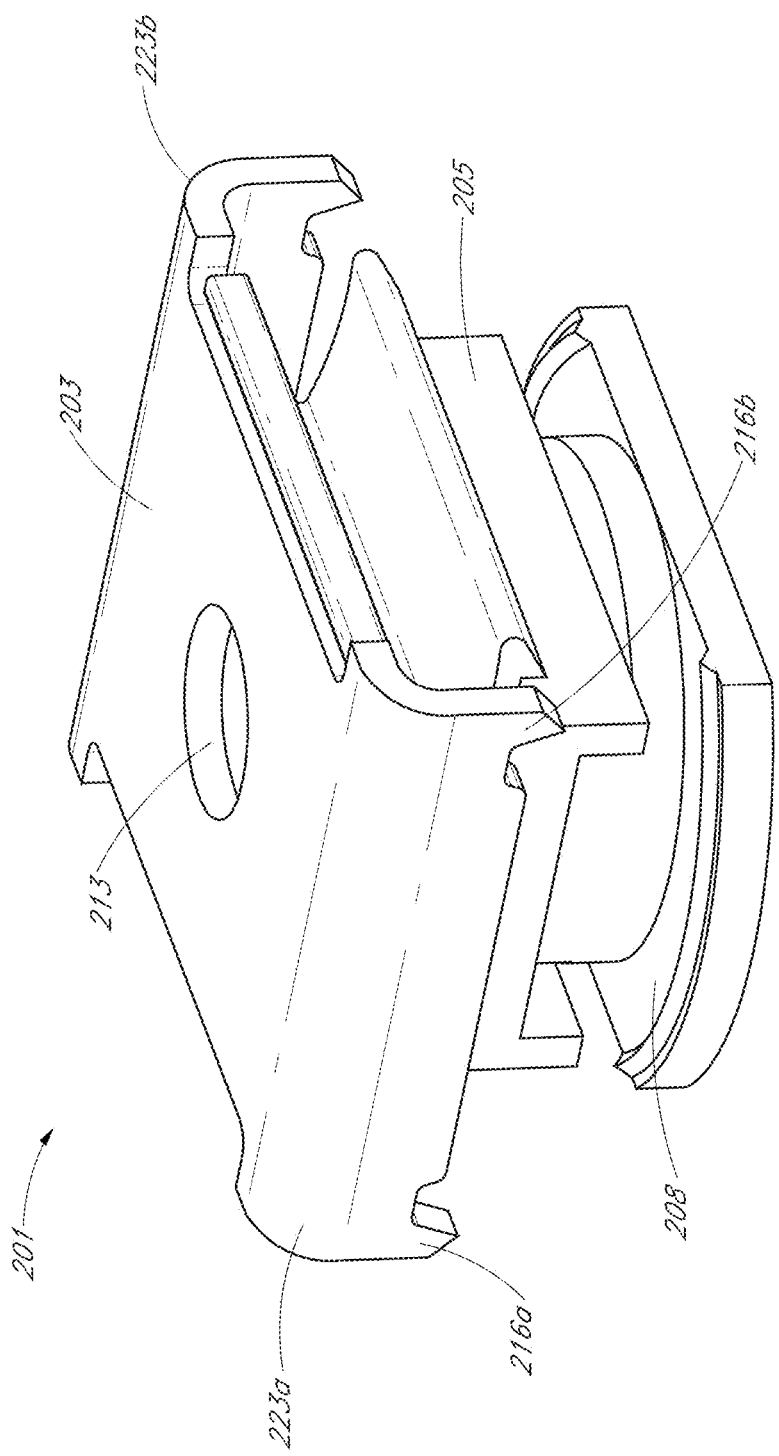
FIG. 10 is a perspective view of a clamp assembly having a stabilization member comprising a compressible clip, according to another embodiment.

FIG. 10 is a perspective view of a clamp assembly 201 having a stabilization member 205 comprising a compressible clip, according to another embodiment. The embodiment of FIG. 10 is generally similar to the embodiment disclosed above with respect to FIGS. 4A-9G. For example, the clamp assembly 201 can include an upper clamp member 203 and a lower clamp member 208. The stabilization member 205 can be provided to prevent relative rotation between the upper clamp member 203 and the lower clamp member 208. The stabilization member 205 can also be biased to support the upper clamp member 203 when the stabilization member 205 is uncompressed or slightly compressed. An opening 213 can be formed through the assembly 201 to receive a fastener for directly coupling the upper clamp member 203 with the lower clamp member 208. As above, the upper clamp member can include first and second arms 223a extending from a major axis. Downwardly-extending projections 216a, 216b can extend from the arms 223a, 223b towards the lower clamp member 208 and can be adapted to secure adjacent solar modules to a rail.

Figure 11:
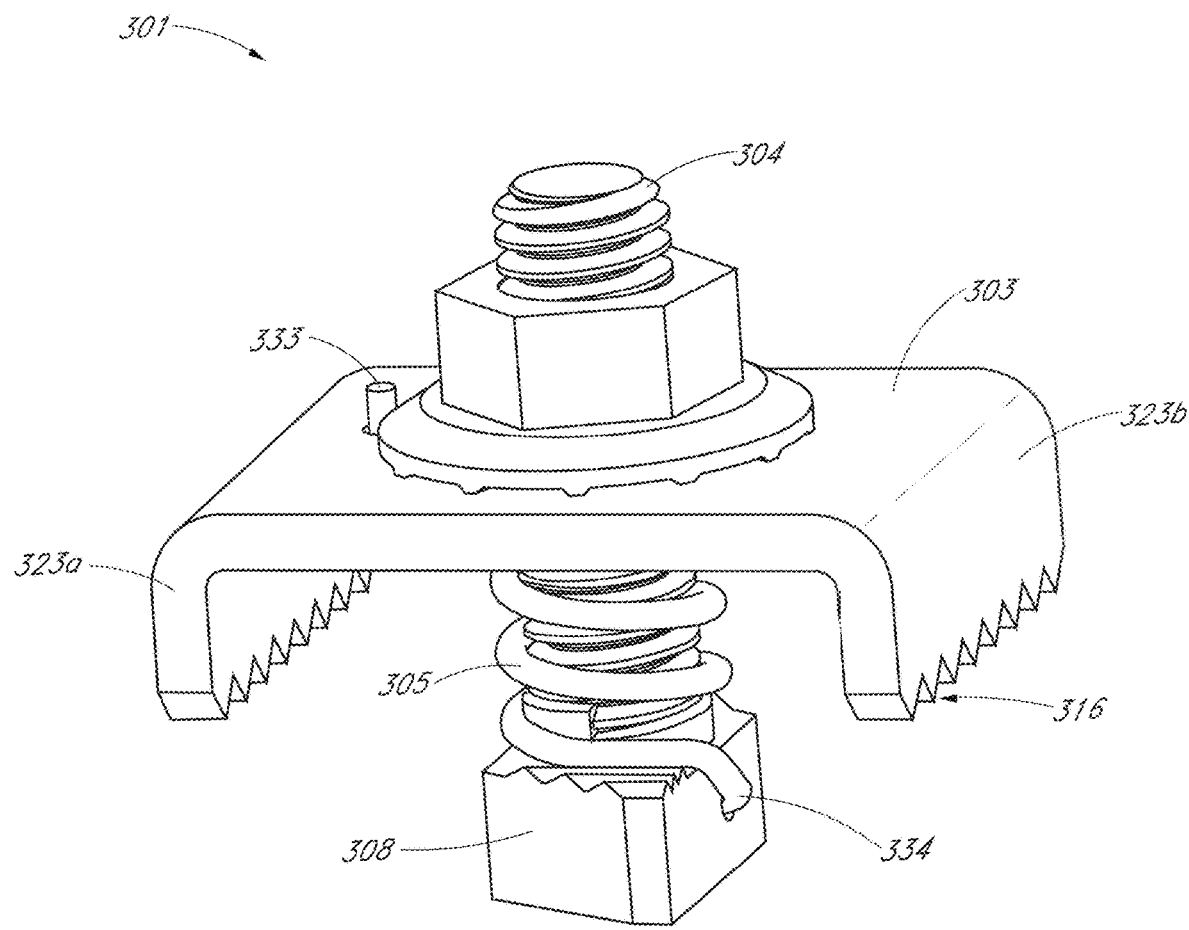
FIG. 11 is a perspective view of a clamp assembly having a stabilization member comprising a spring, according to one embodiment.

FIG. 11 is a perspective view of a clamp assembly 301 having a stabilization member 305 comprising a spring, according to one embodiment. The stabilization member 305 can operate in a manner generally similar to that explained with respect to the embodiments of FIGS. 4A-10. For example, the assembly 301 can include an upper clamp body 303 and a lower clamp body 308. A fastener 304 can pass through the upper clamp body 303 and can threadably couple with the lower clamp body 308. The upper clamp body 303 can include first and second arms 323a, 323b and one or more teeth 316 configured to secure a portion of a solar module to a rail. The stabilization member 305 of FIG. 11 can comprise a spring extending between an upper locking portion 333 and a lower locking portion 334. The stabilization member 305, e.g., the spring, can act to bias the clamp assembly 301 along the major axis w. Further, the locking portions 333, 334 can be configured to substantially prevent relative rotation between the upper clamp member 303 and the lower clamp member 308. Thus, as explained herein, the stabilization member 305 can similarly assist in the assembly and maintenance of the array 110 of solar modules 112.

Figure 12:
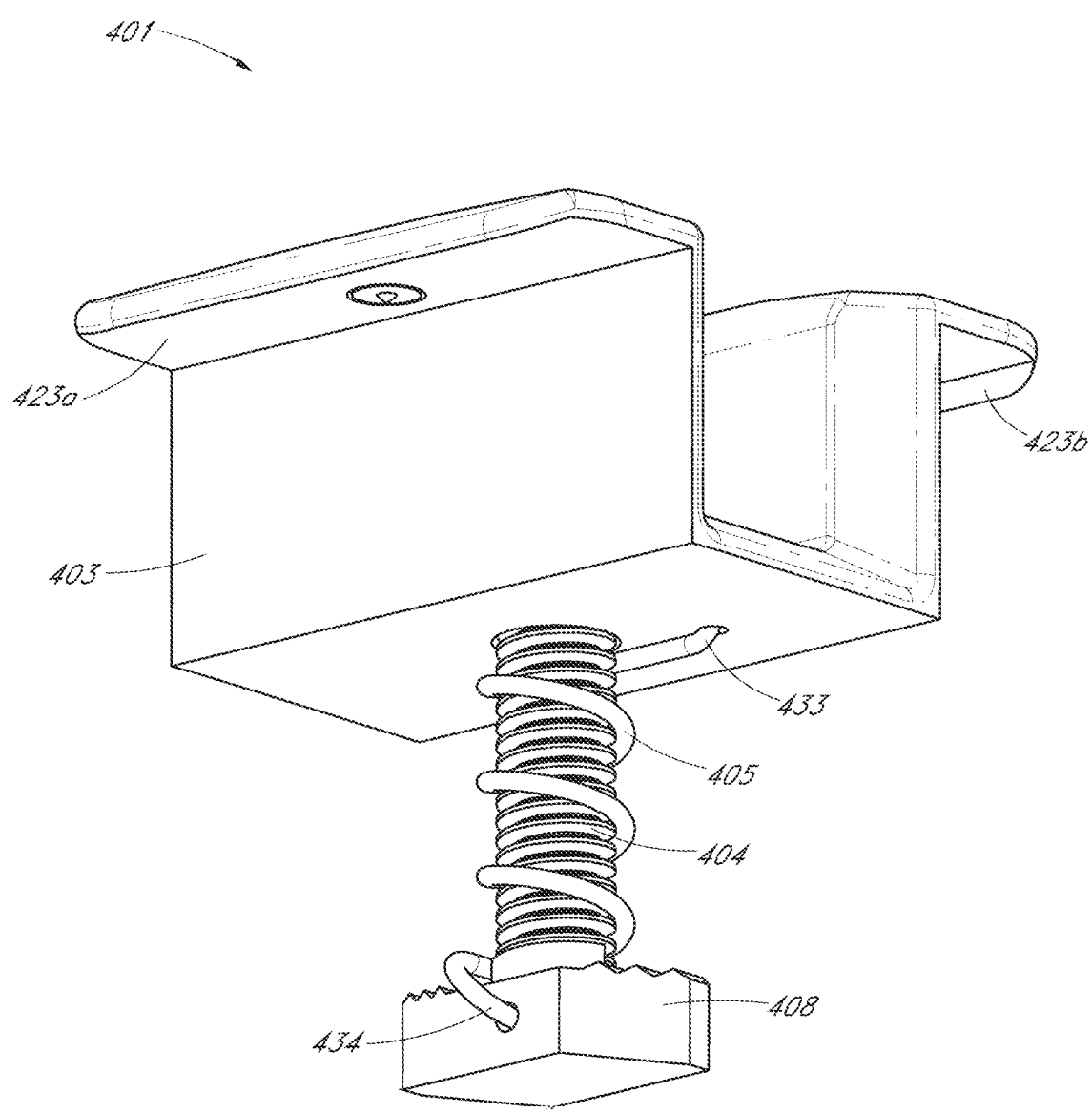
FIG. 12 is a perspective view of a clamp assembly having a stabilization member comprising a spring, according to another embodiment.

FIG. 12 is a perspective view of a clamp assembly 401 having a stabilization member 405 comprising a spring, according to another embodiment. The stabilization member 405 can operate in a manner generally similar to that explained with respect to the embodiments of FIGS. 4A-11. For example, an upper clamp member 403 can couple to a lower clamp member 408 by way of a fastener 404. The fastener 404 can be threadably engaged with the lower clamp member 408 in some arrangements. The upper clamp member 403 can include first and second arms 423a, 423b extending from the major axis. Unlike the embodiment of FIGS. 6A-6B, however, the arms 423a, 423b do not capture the modules by way of downwardly extending projections. Rather, the first and second arms 423a, 423b can capture an edge portion of a solar module between the arms 423a, 423b and the rail. Thus, the embodiments disclosed herein, such as that disclosed in FIG. 12, can be used to clamp edge portions of a solar module, including modules that do not include the lips disclosed herein. As above, the stabilization member 405 can comprise a spring extending between locking portions 433, 434 to support the upper clamp member 403 and prevent rotation of the upper clamp member 403 relative to the lower clamp member 408.

Figure 13B:
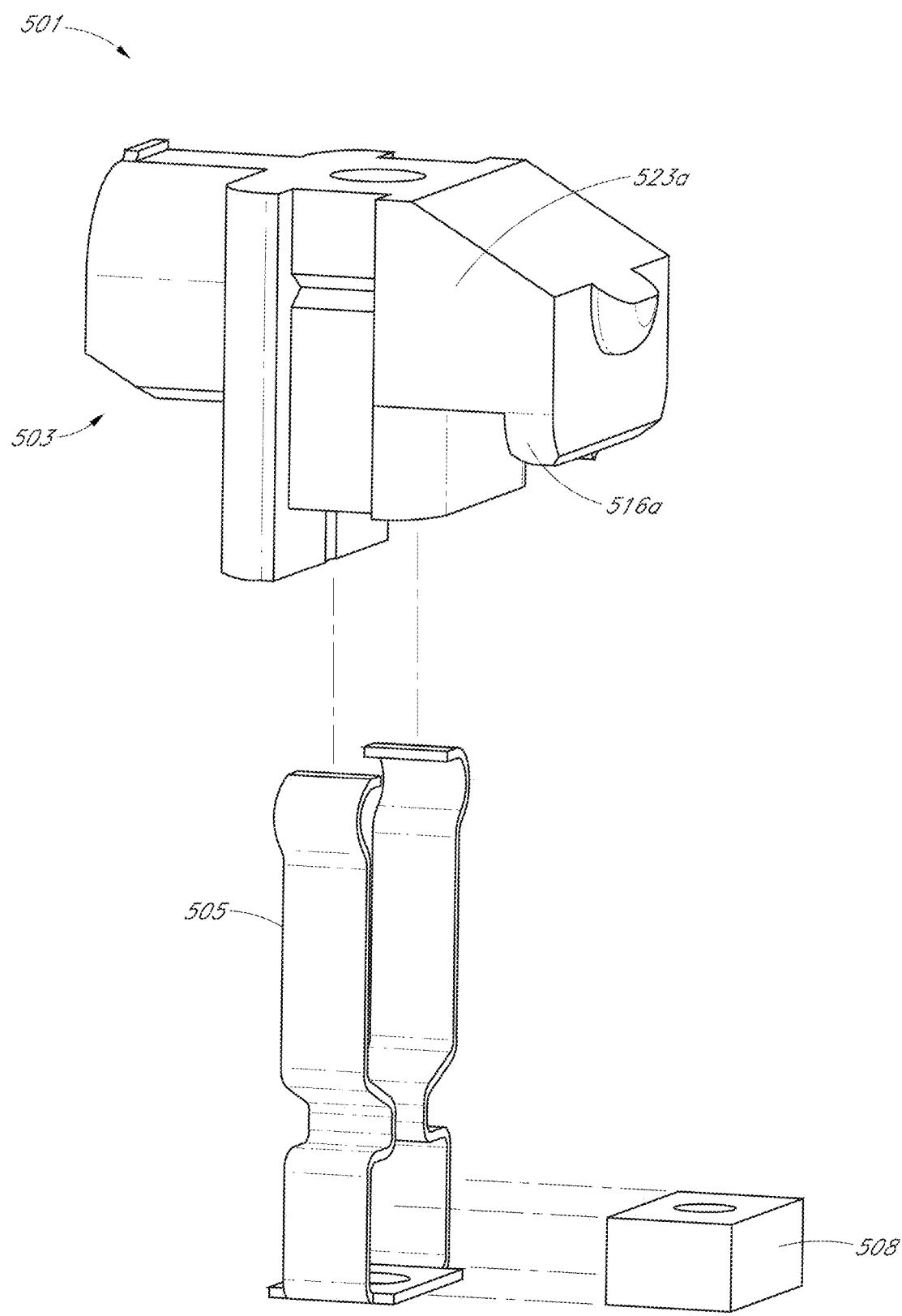
FIG. 13B is an exploded, perspective view of the clamp assembly of FIG. 13A.

FIG. 13A is a perspective view of a clamp assembly 501 comprising a hook-and-swing mechanism, according to one embodiment. FIG. 13B is an exploded, perspective view of the clamp assembly 501 of FIG. 13A. As shown in FIGS. 13A-13B, the clamp assembly 501 can include an upper clamp member 503 and a lower clamp member 508 sized and shaped to be received by a rail. An arm 523a and a projection 516a extending from a distal portion of the arm 523a can be used to couple a solar module to a rail. A stabilization member 505 can couple the upper clamp member 503 with the lower clamp member 508. For example, the stabilization member 505 can include arms that extend about and capture the upper clamp member 503. The lower clamp member 508 can be disposed in a lower portion of the stabilization member 505. As above, the stabilization member 505 can assist in levitating and supporting the upper clamp member 503 relative to the rail, while maintaining the relative orientation between the lower clamp member 508 and the upper clamp member 503. FIG. 13C is a side elevational view of the clamp assembly 501 of FIGS. 13A-13B coupled to a rail 514. As shown in FIG. 13C, the projection 516a can be captured by a frame 506 of the module. In some embodiments, the clamp assembly 501 can couple the frame 506 to the rail 514 by way of a hook and swing motion in which the projection 516a is hooked into the corresponding groove of the frame 506. Frame 506 and solar module can be swung into place along the rail 514 and clamped to the rail 514.

Figure 14:
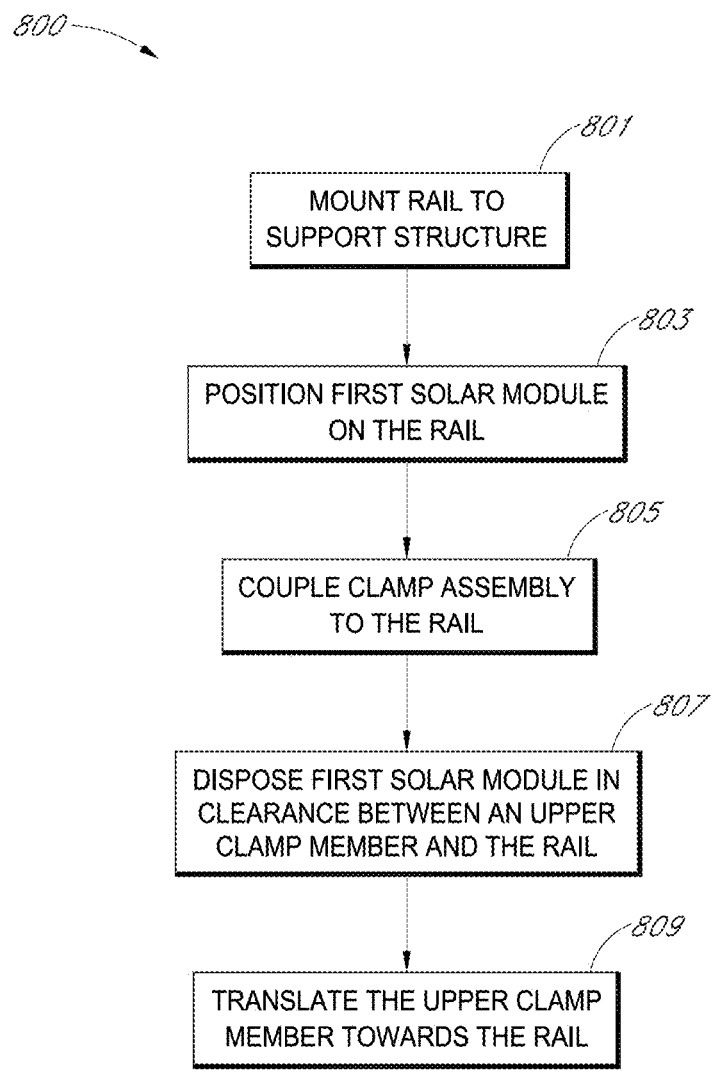
FIG. 14 is a flowchart illustrating a method of mounting a solar array to a support structure.

FIG. 14 is a flowchart illustrating a method 800 of mounting a solar array to a support structure. The method 800 begins in a block 801 to mount a rail to a support structure, such as a roof. The rail can be attached to the support structure by way of, e.g., a brace or bracket. The rail can include a groove having a recess along a length of the rail. The method 800 can move to a block 803 to position a first solar module on the rail. The first solar module can comprise a photovoltaic cell enclosed within a frame, in some arrangements.

The method 800 can move to a block 805 to couple a clamp assembly to the rail. The clamp assembly can include an upper clamp member, a lower clamp member coupled to the rail, and a stabilization member biased such that the upper clamp member is disposed above the rail by a clearance. The stabilization member can prevent rotation of the lower clamp member relative to the upper clamp member. In some embodiments, the lower clamp member can include a lower body having a length and a width smaller than the length. The lower body can be inserted into the groove of the rail such that the length of the lower body is substantially aligned with the length of the rail. The lower body of the lower clamp member can be rotated such that the length of the lower body is transverse to the length of the rail and such that a lower portion of the stabilization member engages the rail.

Turning to a block 807, the first solar module can be disposed in the clearance between the upper clamp member and the rail. In some embodiments, a second solar module is positioned on the rail adjacent the first solar module. The second solar module can be disposed in the clearance between the upper clamp member and the rail.

The method moves to a block 809 to translate the upper clamp member towards the rail to clamp an edge portion of the first solar module between the upper clamp member and the rail. An edge portion of the second solar module can also be clamped between the upper clamp member and the rail.

Figure 15A:
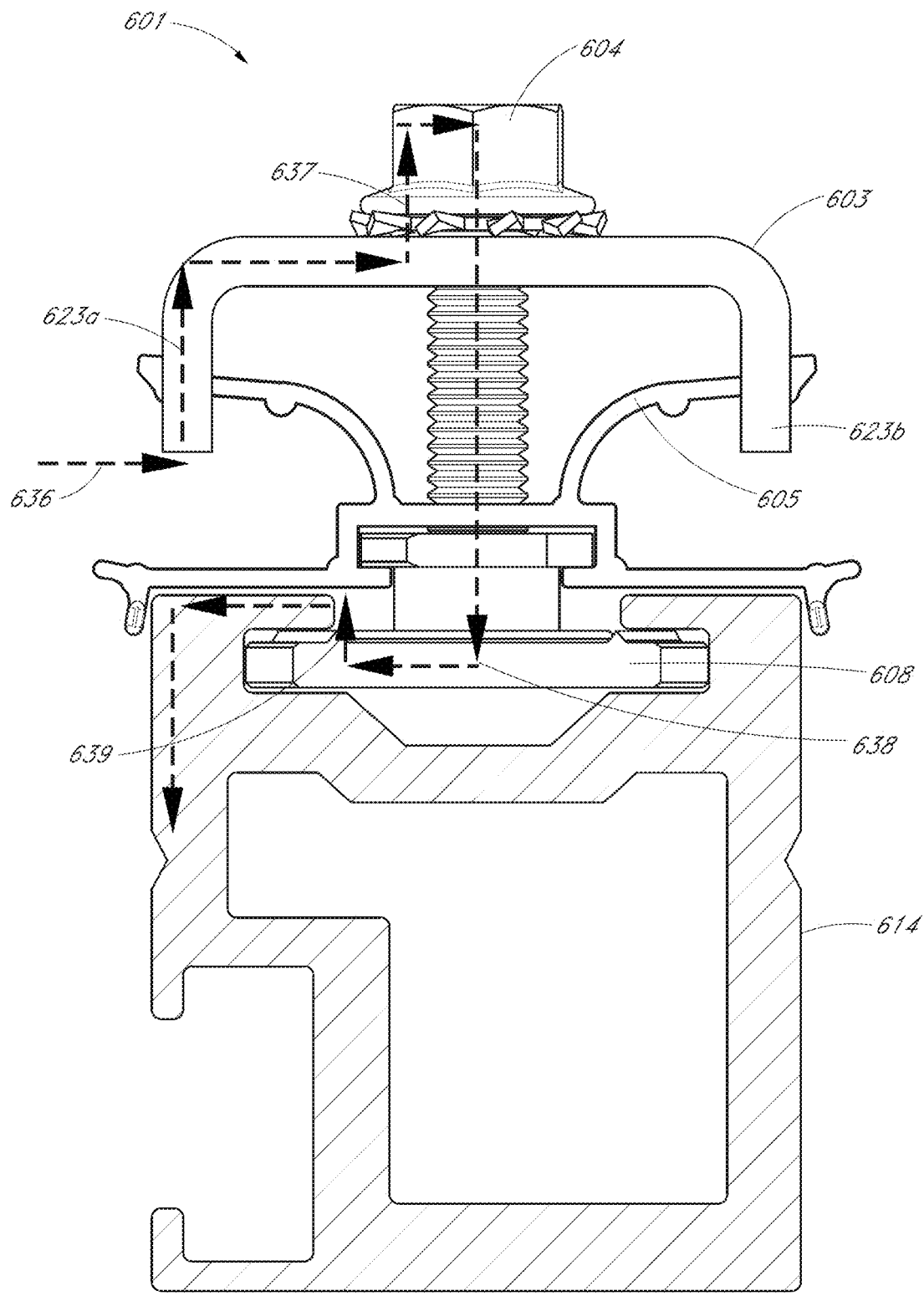
FIG. 15A is a side elevational view of the clamp assembly and rail in the clamped configuration shown in FIG. 9E with a schematic representation of an electrical pathway to ground.

It can be important in various arrangements to ensure that the components of the system 100 are grounded. For example, grounding system components can improve the safety of the system and/or can maintain system performance. FIG. 15A is a side elevational view of the clamp assembly 602 and rail 614 in the clamped configuration shown in FIG. 9E with a schematic representation of an electrical pathway 636 to ground. As shown in FIG. 15A, the arms 623a, 623b of the upper clamp member 603 can mechanically engage with the solar module, e.g., with a portion of the frame. For example, the arms 623a, 623b can cut into or otherwise mechanically compress against the module to create an electrical pathway 636 between the upper clamp body 603 and the module.

The electrical pathway 636 can pass through the upper clamp body 603 and into the fastener 604 by way of the washer 607. The pathway 636 can pass along the length of the fastener 604 and can couple to the lower clamp member 608 by way of the threaded connection. The electrical pathway 636 can pass from the lower clamp member 608 to the rail 614 by way of the arcuate contact ridges 127 shown in FIG. 8. Thus, the electrical pathway 636 can couple between the upper clamp member 603 and the fastener 604 at contact point 637. The pathway 636 can pass from the fastener 638 to the lower clamp member 608 at contact point 638, and can pass from the lower clamp member 608 to the rail by way of the ridges 127 at contact point 639.

Figure 15B:
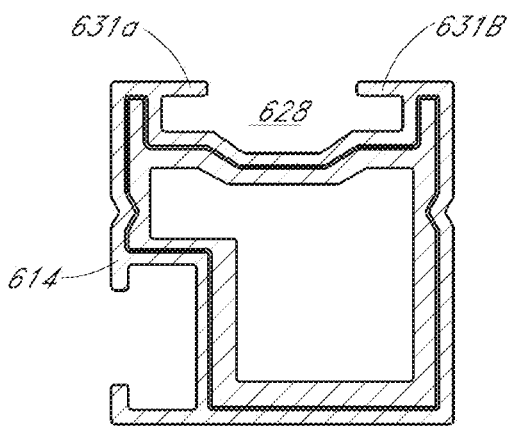
FIG. 15B is a side elevational view a rail, according to one embodiment.

FIG. 15B is a side elevational view of a rail 614, according to one embodiment. FIG. 15C is a top plan view of the rail shown in FIG. 15B. For example, the arcuate contact ridge 127 of the lower clamp member 108 can bear against the ledges 631a, 631b and create an electrical pathway therebetween. It can be advantageous, however, to improve the electrical connection between the rail 614 and the lower clamp member 108 to improve the grounding of the system 100.

Figure 15D:
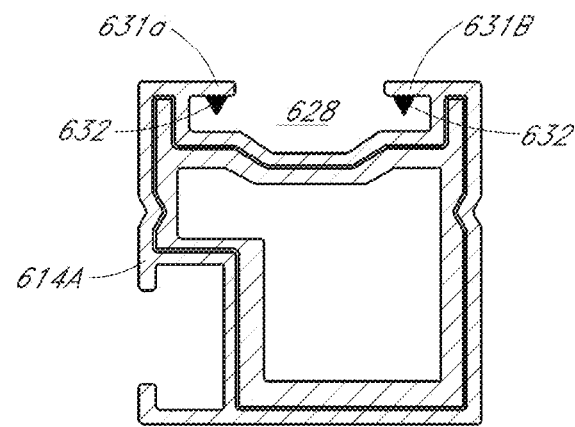
FIG. 15D is a side elevational view of a rail having a plurality of ribs, according to one embodiment.
Figure 15C:
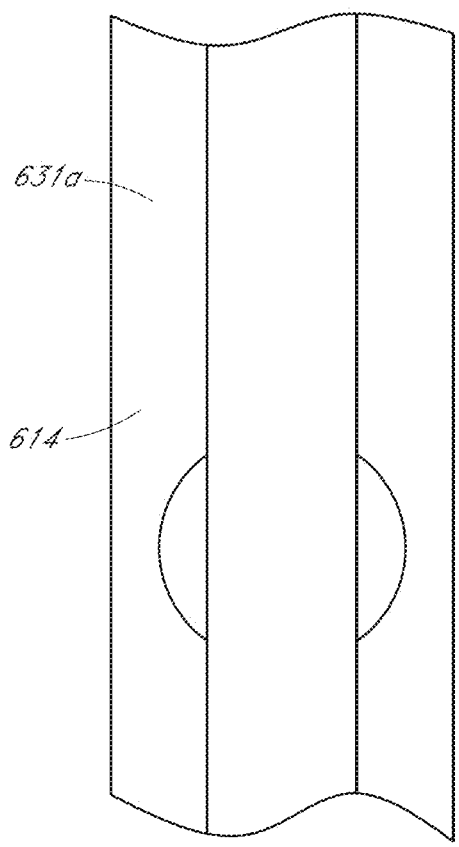
FIG. 15C is a top plan view of the rail shown in FIG. 15B.
Figure 15E:
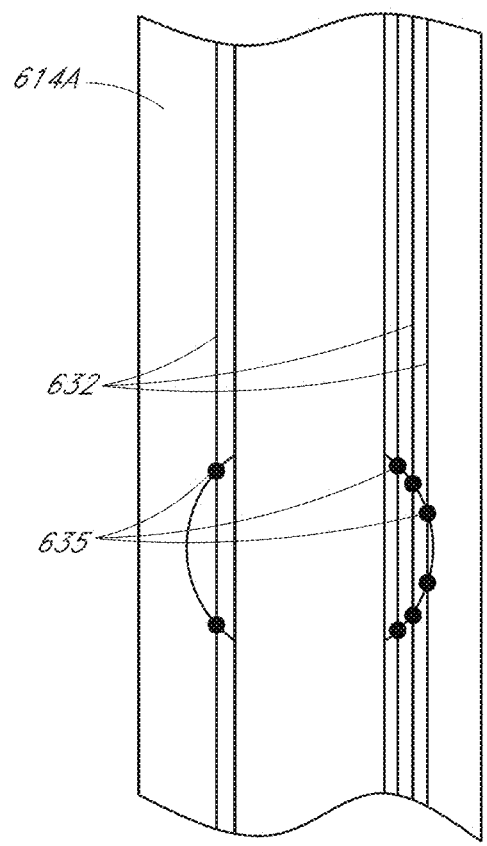
FIG. 15E is a top plan view of the rail shown in FIG. 15D.

FIG. 15D illustrates a rail 614A having a plurality of ribs 632, according to one embodiment. FIG. 15E is a top plan view of the rail 614A shown in FIG. 15D. The ribs 632 can comprise sharpened projections extending downwardly from the ledges 631a, 631b towards the recess of the groove 628. The ribs 632 can be extruded with the rail 614A. Thus, because the ribs 632 can be defined with the cross-section of the rail 614A, any suitable number of ribs 632 can be included in the rail 614A. Extruding the ribs 632 can be relatively simple and cost effective from a manufacturing standpoint.

Multiple ribs 632 extending from the ledges 631a, 631b can create multiple electrical contact points 635 and multiple corresponding electrical pathways when the lower clamp member 608 is clamped against the rail 614A. For example, as shown in FIG. 15D, the intersection between the arcuate contact ridge 127 of the lower clamp member 108 and the ribs 632 can form a plurality of contact points 635 and electrical pathways to ground. Because the ribs 632 are relatively sharp, the contact area can be reduced, and the interfacial pressure can be increased, which can accordingly increase the electrical conductance between the lower clamp member 108 and the rail 614A. Thus, at least because the multiple ribs 632 create multiple electrical pathways 636, the embodiment of FIGS. 15D-15E can improve the grounding of the system 100 relative to other arrangements.

Figure 16:
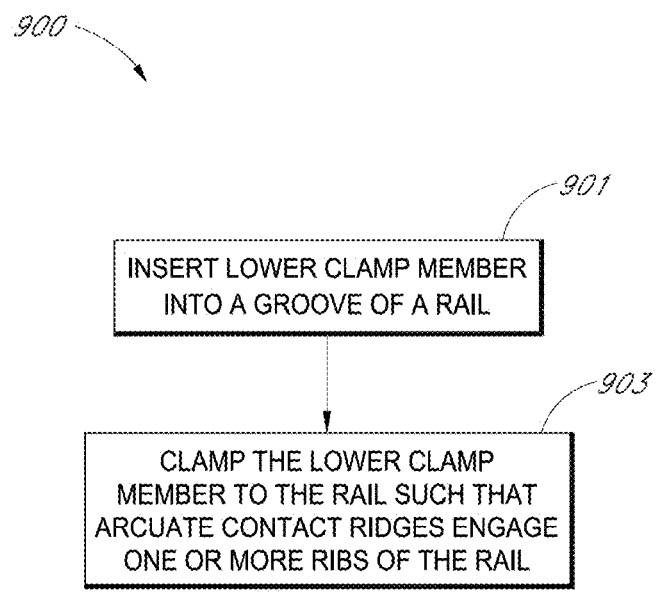
FIG. 16 is a flowchart illustrating a method for grounding a solar power system, according to one embodiment.

FIG. 16 is a flowchart illustrating a method 900 for grounding a solar power system, according to one embodiment. The method 900 begins in a block 901 to insert a lower clamp member into a groove of a rail. The groove can extend along a length of the rail. The lower clamp member can comprise an arcuate contact ridge. The rail can comprise multiple ribs extending towards the lower clamp member from ledges that define an aperture of the rail.

The method 900 moves to a block 903 to clamp the lower clamp member to the rail such that the arcuate contact ridges engage one or more ribs of the rail. As explained herein, providing multiple ribs can create multiple electrical pathways between the lower clamp member and the rail. By creating multiple electrical pathways between the rail and the clamp assembly, the grounding of the system can be improved.

In other embodiments disclosed herein, it can be advantageous to provide a skirt about a periphery of the array 110. For example, electrical and/or mechanical components (such as wires, fasteners, other hardware, etc.) can be provided underneath the array 110. For aesthetic purposes, it can be desirable to hide the components underneath the array 110. Furthermore, it can be desirable to directly couple the skirt to the solar module itself (rather than to the mounting structure, such as a brace or rail) so that the skirt can be provided about the entire perimeter of the array 110 regardless of the shape of the array.

Figure 17A:
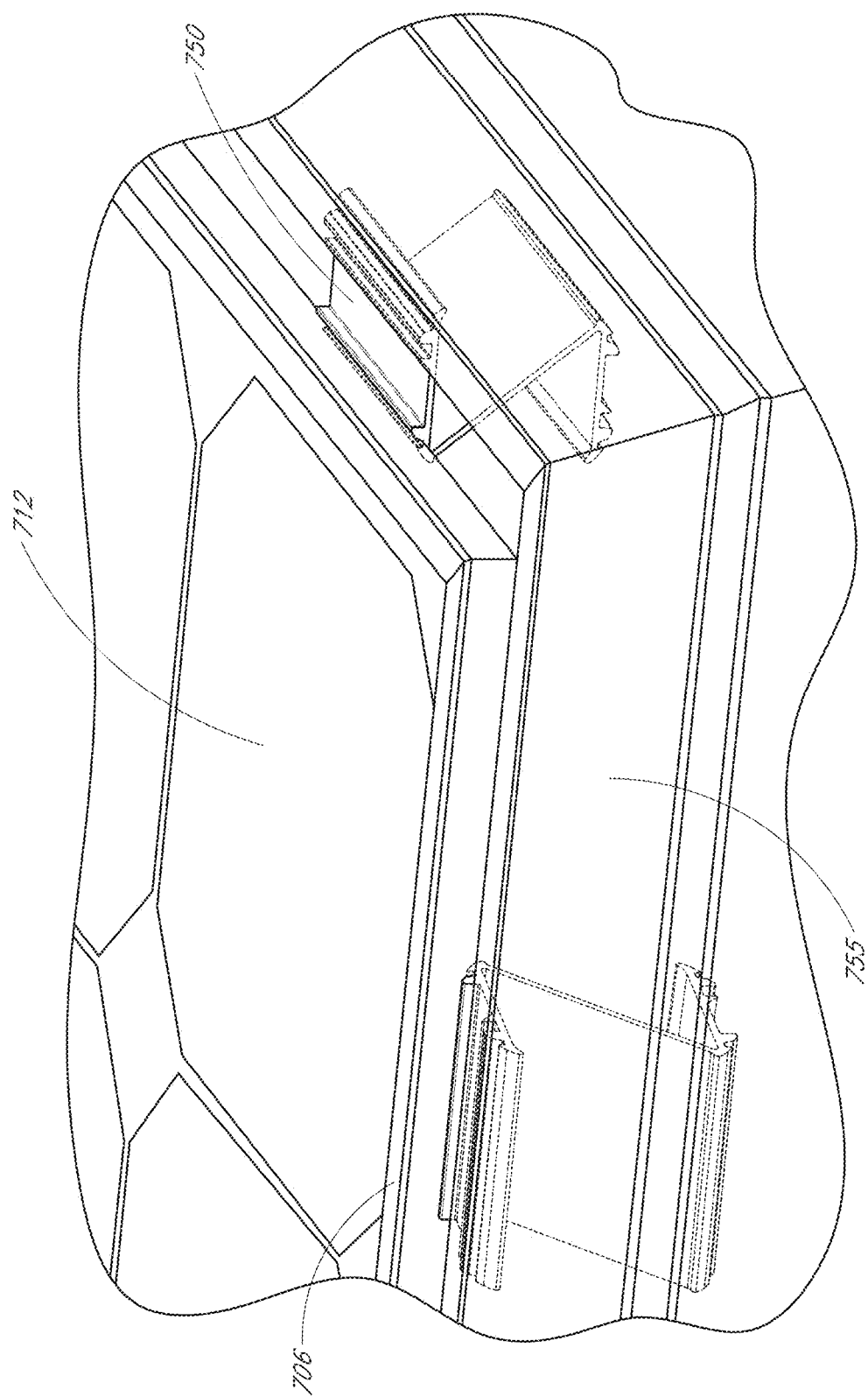
FIG. 17A is a perspective view of a solar module coupled to a skirt by way of a skirt clip, according to one embodiment.

FIG. 17A is a perspective view of a solar module 712 coupled to a skirt 755 by way of a skirt clip 750, according to one embodiment. The skirt clip 750 of FIG. 17A can directly couple the skirt 755 to the module frame 706 rather than to external mounting components, such as a rail or brace. By coupling to the frame 706 of the solar module 712, the skirt 755 can be applied about any arbitrary perimeter of the array 110. The skirt 755 can be applied about the perimeter of the array 110 in multiple skirt segments. For example, multiple skirt segments can be coupled to the perimeter of the array 110 adjacent one another to form a substantially continuous skirt about the periphery of the solar array 110.

Figure 17C:
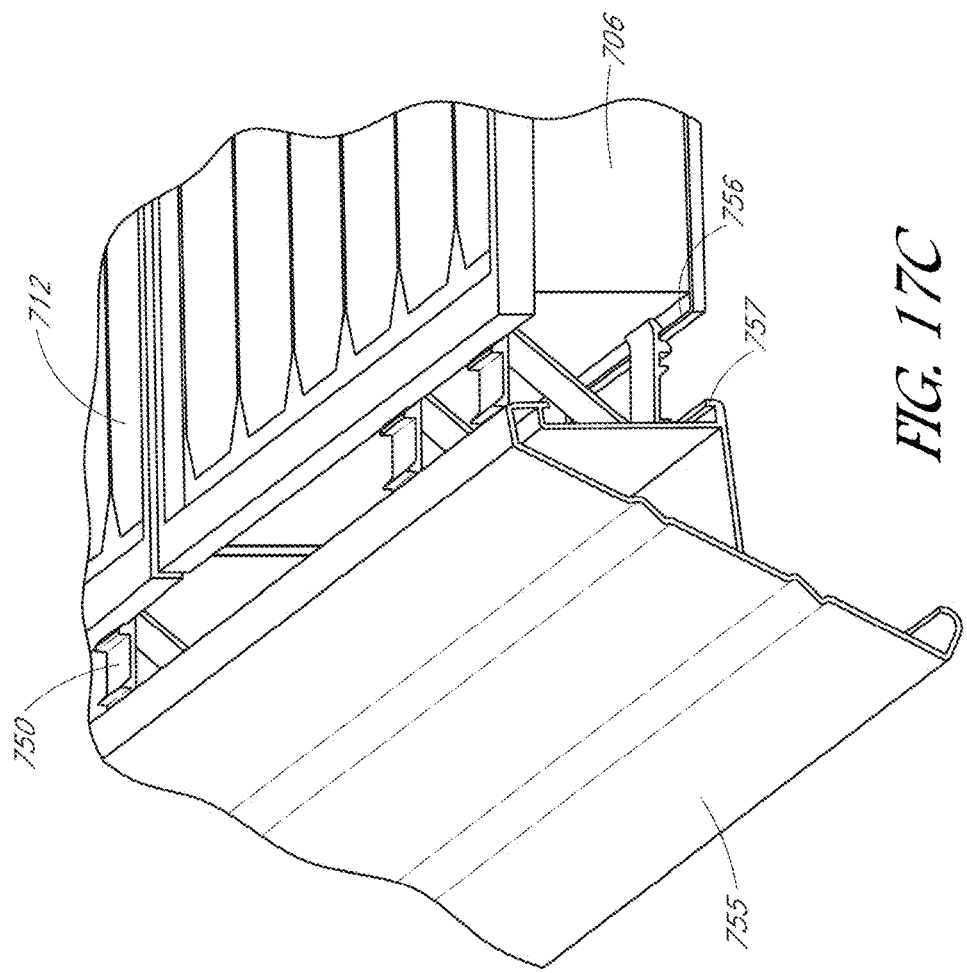
FIG. 17C is an enlarged perspective view of the solar module and skirt clip after attachment of the skirt.
Figure 17B:
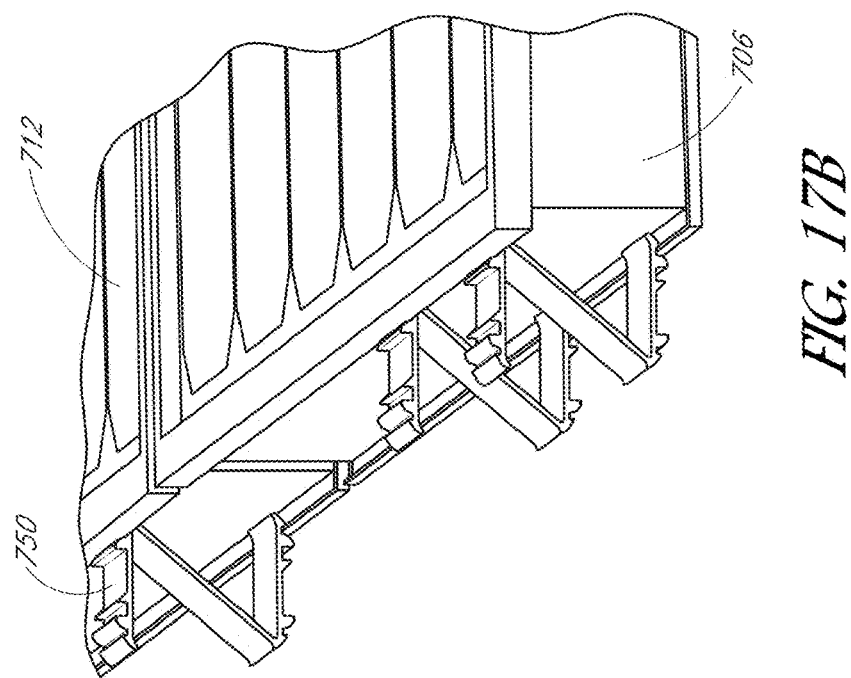
FIG. 17B is an enlarged perspective view of the solar module and skirt clip before attachment of the skirt.

FIG. 17B is an enlarged perspective view of the solar module 712 and skirt clip 750 before attachment of the skirt 755. FIG. 17C is an enlarged perspective view of the solar module 712 and skirt clip 750 after attachment of the skirt 755. As shown in FIG. 17B, the skirt clip 750 can be snapped into place along the perimeter of the module 712. For example, the skirt clip 750 can snap into a lip 756 of the module 712 to couple the clip 750 to the module 712. Upon snapping the clip 750 to the module 712, the skirt clip 750 can similarly be snapped into place along the skirt 755, as shown in FIG. 17C. For example, the skirt clip 750 can snap into a corresponding lip 757 of the skirt 755. Accordingly, in some embodiments, the skirt 755 can have lips 757 that generally mirror corresponding lips 756 of the frame 706 of the solar module 712. The mirror symmetry of the skirt 755 and skirt clip 750 can enable the application of the skirt 755 about any suitable perimeter of an array 110.

Figure 17D:
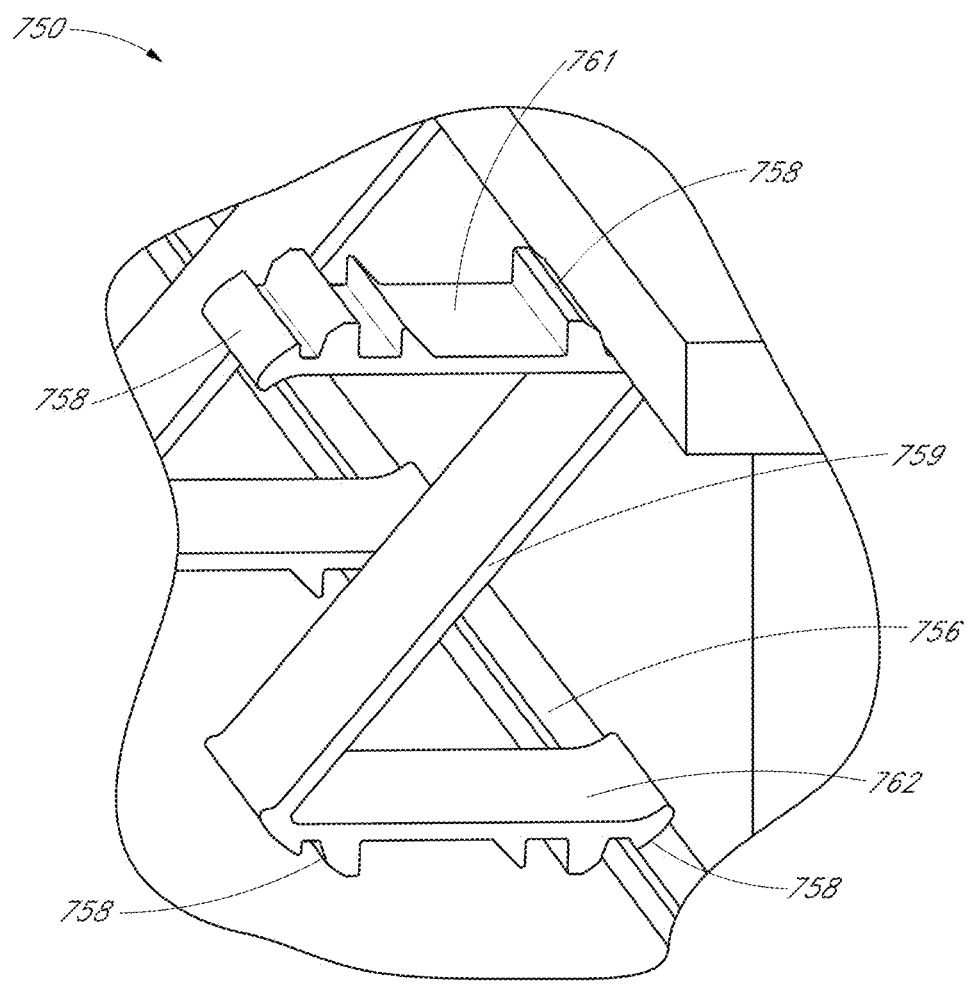
FIG. 17D is a further enlarged perspective view of the skirt clip.

FIG. 17D is a further enlarged perspective view of the skirt clip 750 shown in FIGS. 17A-17C. The skirt clip 750 can comprise an upper portion 761, a lower portion 762, and a connecting portion 759 that connects the upper and lower portions 761, 762. As shown in FIG. 17D, the skirt clip 750 can define a generally Z-shaped cross-section such that a first end of the connecting portion 759 connects one end of the upper portion 761 with an opposing end of the lower portion 762. The upper portion 761 and the lower portion 762 can each define two slots 758 sized and shaped to engage corresponding lips 756 of the solar module 712 and lips 757 of the skirt 755. The slots 758 and corresponding lips 756, 757 can engage in a snap-fit connection to couple the skirt 755 to the solar module 712 by way of the skirt clip 750.

To couple the skirt 755 to the module 712, the assembler can assemble the array 110 to any desired size and defining any suitable perimeter. The assembler can snap a plurality of clips to outer portions of frames of the solar modules. As explained herein, the assembler can snap slots 758 of the clip 750 with corresponding lips 756 of the solar modules 712. The assembler can also snap the clips to inner portions of the skirt 755. For example, slots 758 can be snapped into corresponding lips 757 of the skirt 755 to couple the skirt 755 to the array 110. Because the skirt 755 is coupled directly to the modules 712, the skirt 755 can be applied about any suitable perimeter of the array 110.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A solar power system comprising:
   a first laminate including a plurality of solar cells electrically interconnected and encapsulated within a weather-proof barrier; and
   a first frame around a periphery of the first laminate, the first frame including:
      an upper frame portion, a lower frame portion, and a central portion, the central portion extending continuously in a straight line vertically from a first distal most point in contact with a longitudinal lower face of the upper frame portion to a second distal most point in contact with a longitudinal upper face of the lower frame portion;
      the upper frame portion including an inwardly extending frame channel and an outwardly extending upper frame lip;
      the lower frame portion including an outwardly extending lower frame lip configured to engage with a clamp assembly and an inwardly extending horizontal flange;
      a first end of the inwardly extending horizontal flange being positioned directly below the central portion of the first frame;
      the inwardly extending horizontal flange being positioned directly below the inwardly extending frame channel.

2. The solar power system of claim 1, wherein the upper frame lip comprises a projection extending downward and parallel to the central portion of the first frame, and wherein the lower frame lip comprises a projection extending upward and parallel to the central portion of the first frame.

3. The solar power system of claim 1, further comprising:
   a skirt; and
   a skirt clip comprising an upper notch configured to engage with the upper frame lip and a lower notch configured to engage with the lower frame lip.

4. The solar power system of claim 1, further comprising:
   the clamp assembly having a major axis, the clamp assembly comprising:
      an upper clamp member comprising a first arm extending perpendicular to the major axis;

a lower clamp member configured to be coupled to a mounting structure; and a stabilization member supporting the upper clamp member at a position vertically spaced above the lower clamp member, the stabilization member being configured to transition between a relaxed state and a compressed state, wherein the stabilization member in the relaxed state prevents translation of the upper clamp member towards the lower clamp member along the major axis, wherein the stabilization member in the compressed state is compressed such that the upper clamp member is translated towards the lower clamp member along the major axis relative to the relaxed state, wherein the clamp assembly is configured to transition between a clamped configuration and an unclamped configuration, wherein, when the clamp assembly is in the clamped configuration, the stabilization member is in the compressed state and the first arm of the upper clamp member engages the lower frame lip of the first frame to secure the first laminate to the mounting structure; and wherein, when the clamp assembly is in the unclamped configuration, the stabilization member is in the relaxed state such that the upper clamp member is disposed at a sufficient clearance above the mounting structure to permit insertion of the lower frame lip of the first frame between the upper clamp member and the mounting structure.

5. The solar power system according to claim 4, further comprising:

a second laminate including a second frame having a lower frame lip; and a second arm of the upper clamp member extending in an opposite direction to the first arm, the second arm being configured to secure the second laminate to the mounting structure.

6. The solar power system according to claim 5, wherein the first arm captures the lower frame lip of the first laminate and the second arm captures the lower frame lip of the second laminate such that first and second laminates are secured between the first and second arms and the mounting structure.

7. The solar power system according to claim 4, further comprising a fastener extending along the major axis and coupling the upper clamp member with the lower clamp member.

8. The solar power system according to claim 7, wherein the fastener is a threaded fastener, and wherein the threaded fastener threadably couples the upper clamp member with the lower clamp member.

9. The solar power system according to claim 7, wherein the fastener passes through the upper clamp member to couple with the lower clamp member.

10. The solar power system according to claim 4, wherein the first arm comprises at least one projection extending downward and parallel to the major axis.

11. The solar power system according to claim 4, wherein the first arm comprises one or more teeth configured to secure a portion of first laminate to the mounting structure.

12. The solar power system according to claim 4, wherein the mounting structure includes a rail comprising a groove that defines an aperture and a recess along a length of the rail, and wherein the lower clamp member of the clamp assembly is configured to be inserted into the groove of the rail.

13. The solar power system according to claim 4, wherein the stabilization member comprises a spring extending between the upper clamp member and the lower clamp member.

14. The solar power system according to claim 4, wherein a clamp assembly comprises a hook-and-swing mechanism, and wherein the stabilization member includes one or more arms that extend about and capture the upper clamp member.

* * * * *